US010728689B2

(12) United States Patent
Swaminathan et al.

(10) Patent No.: US 10,728,689 B2
(45) Date of Patent: Jul. 28, 2020

(54) SOUNDFIELD MODELING FOR EFFICIENT ENCODING AND/OR RETRIEVAL

(71) Applicant: QUALCOMM Incorporated, San Diego, CA (US)

(72) Inventors: Siddhartha Goutham Swaminathan, San Diego, CA (US); S M Akramus Salehin, San Diego, CA (US); Dipanjan Sen, San Diego, CA (US); Michael Ericson, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/219,714

(22) Filed: Dec. 13, 2018

(65) Prior Publication Data
US 2020/0196086 A1    Jun. 18, 2020

(51) Int. Cl.
*H04S 7/00* (2006.01)
*G06F 3/16* (2006.01)
*G02B 27/01* (2006.01)

(52) U.S. Cl.
CPC ............ *H04S 7/304* (2013.01); *G02B 27/017* (2013.01); *G06F 3/165* (2013.01); *H04S 2400/15* (2013.01); *H04S 2420/11* (2013.01)

(58) Field of Classification Search
CPC .. H04S 7/304; H04S 2400/15; H04S 2420/11; G02B 27/017; G06F 3/165
USPC .................................. 381/1, 56, 58, 124, 310
See application file for complete search history.

(56) References Cited

U.S. PATENT DOCUMENTS

| 2011/0249819 | A1* | 10/2011 | Davis | ...................... H04S 5/005 381/17 |
| 2012/0155653 | A1* | 6/2012 | Jax | ......................... G10L 19/008 381/22 |
| 2014/0025386 | A1 | 1/2014 | Xiang et al. | |
| 2018/0300940 | A1* | 10/2018 | Sakthivel | ................ G06T 15/06 |
| 2019/0335287 | A1* | 10/2019 | Jung | ....................... H04S 3/008 |

FOREIGN PATENT DOCUMENTS

WO    2018132677 A1    7/2018

OTHER PUBLICATIONS

International Search Report and Written Opinion—PCT/US2019/066060—ISA/EPO—dated Apr. 7, 2020 (15 pp.).

* cited by examiner

*Primary Examiner* — William A Jerez Lora
(74) *Attorney, Agent, or Firm* — Kilpatrick Townsend & Stockton

(57) ABSTRACT

Methods, systems, computer-readable media, and apparatuses for characterizing portions of a soundfield are presented. Some configurations include estimating a total energy of a soundfield associated with a scene space and, for each of at least some of a plurality of regions of the scene space, estimating an energy of a portion of the soundfield that corresponds to the region and creating a corresponding metadata field that indicates a location of the region within the space and a relation between the estimated total energy and the estimated energy that corresponds to the region.

20 Claims, 18 Drawing Sheets

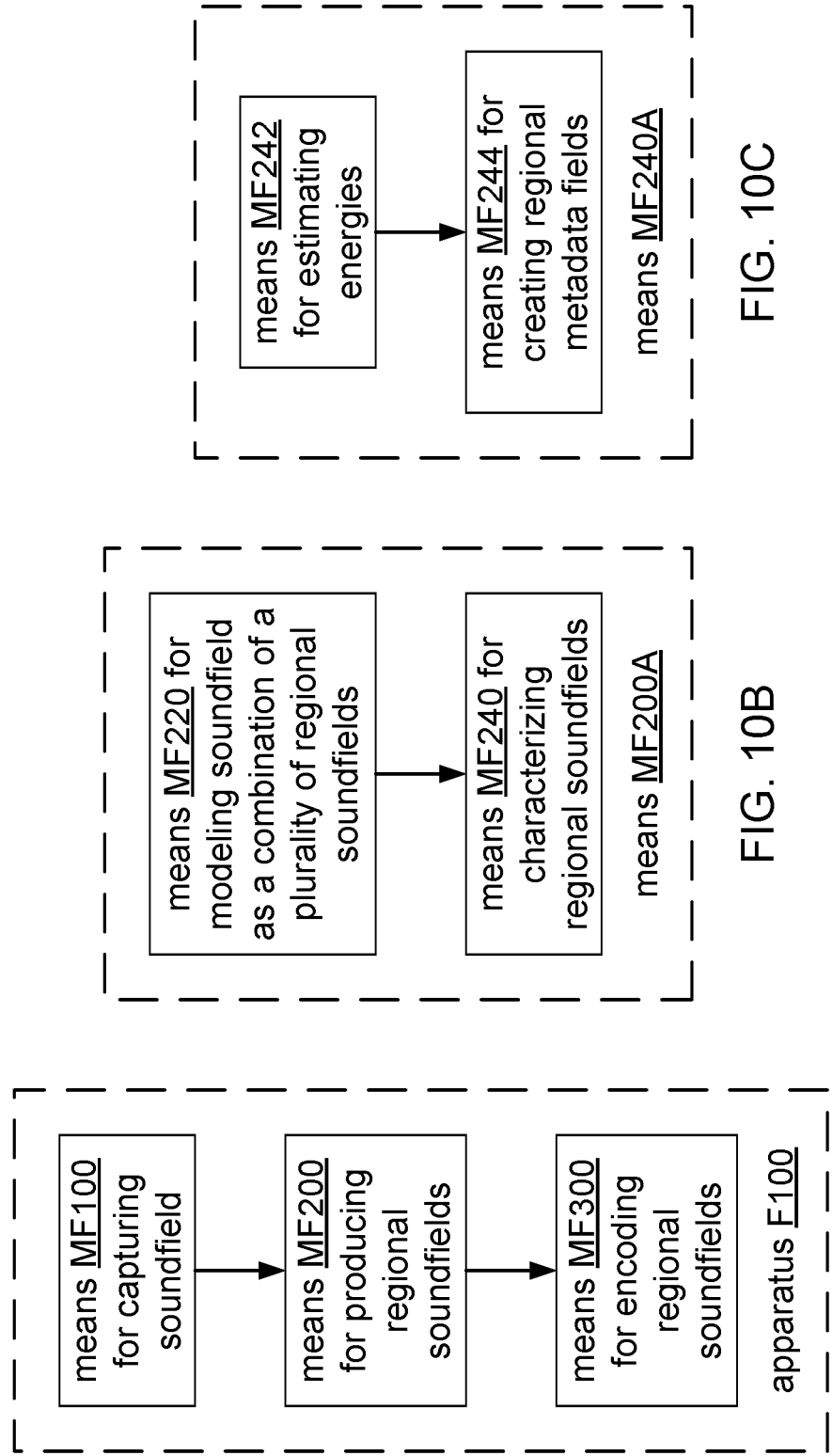

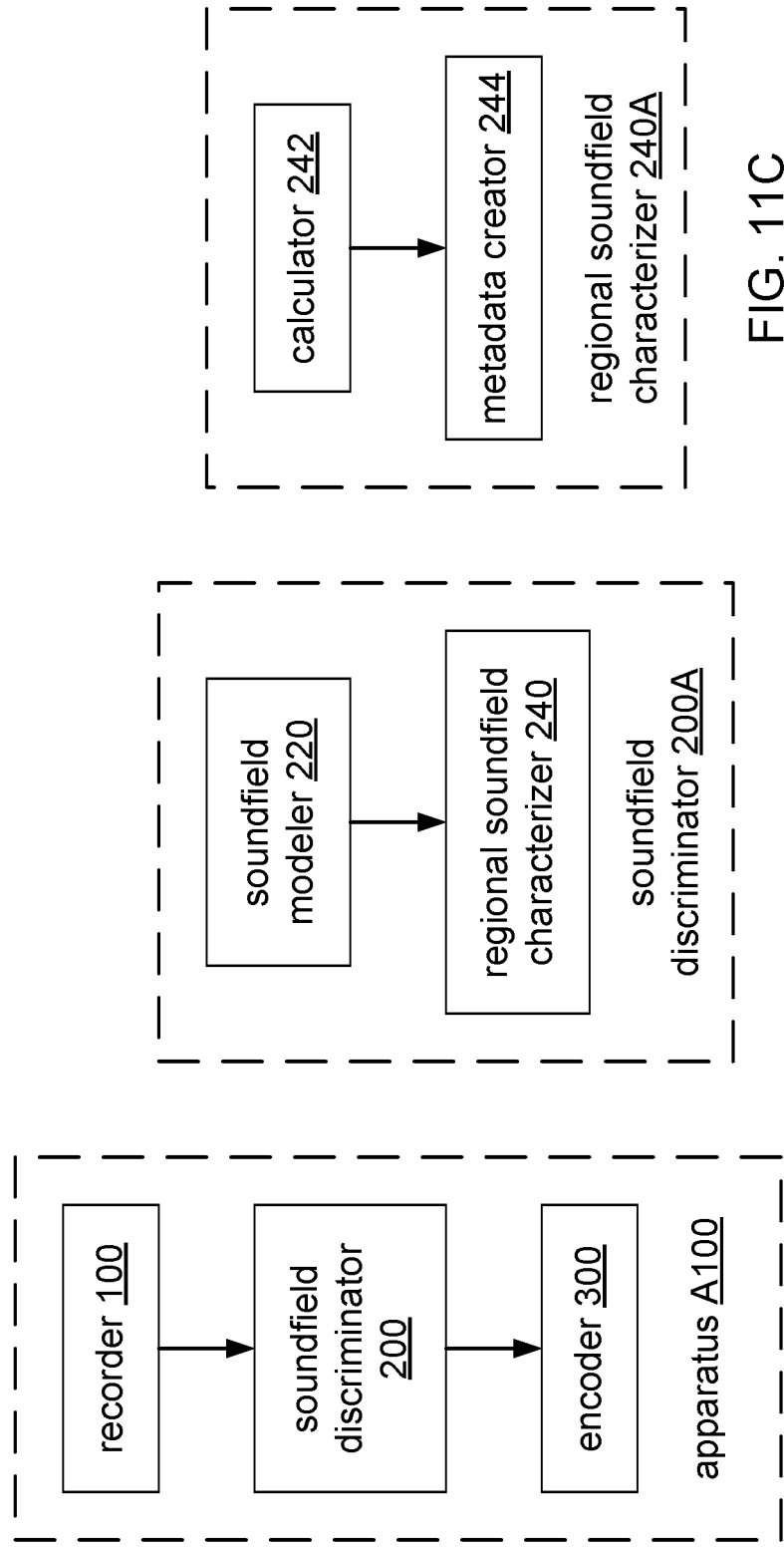

SOUNDFIELD MODELING FOR EFFICIENT ENCODING AND/OR RETRIEVAL

FIELD OF THE DISCLOSURE

Aspects of the disclosure relate to audio signal processing.

BACKGROUND

Hardware for virtual reality (VR) may include one or more screens to present a visual scene to a user, one or more sound-emitting transducers (e.g., an array of loudspeakers, or an array of head-mounted transducers) to provide a corresponding audio environment, and one or more sensors to determine a position, orientation, and/or movement of the user. FIG. 1 shows an example of a VR headset. To support an immersive experience, such a headset may detect an orientation of the user's head in three degrees of freedom (3DOF)—rotation of the head around a top-to-bottom axis (yaw), inclination of the head in a front-to-back plane (pitch), and inclination of the head in a side-to-side plane (roll)—and adjust the provided audio environment accordingly.

BRIEF SUMMARY

A method of characterizing portions of a soundfield according to a general configuration includes estimating a total energy of a soundfield associated with a scene space; and, for each of at least some of a plurality of regions of the scene space, estimating an energy of a portion of the soundfield that corresponds to the region and creating a corresponding metadata field that indicates a location of the region within the space and a relation between the estimated total energy and the estimated energy that corresponds to the region. In this method, a further metadata field indicates a defined partitioning of the scene space into the plurality of regions. Computer-readable storage media comprising code which, when executed by at least one processor, causes the at least one processor to perform such a method are also disclosed.

An apparatus according to a general configuration includes a calculator configured to estimate a total energy of a soundfield associated with a scene space. The calculator is also configured to estimate, for each of at least some of a plurality of regions of the scene space, an energy of a portion of the soundfield that corresponds to the region. The apparatus also includes a metadata creator configured to create, for each of the at least some of a plurality of regions of the scene space, a corresponding metadata field that indicates a location of the region within the space and a relation between the estimated total energy and the estimated energy that corresponds to the region. In this apparatus, a further metadata field indicates a defined partitioning of the scene space into the plurality of regions. Apparatus comprising a memory configured to store computer-executable instructions and a processor coupled to the memory and configured to execute the computer-executable instructions to perform such estimation and creation operations are also disclosed.

A method of selecting regional soundfields according to a general configuration includes receiving a location of a user within a scene space associated with a soundfield; receiving, for each of a plurality of regions of the scene space, information indicating a location of the region within the scene space; receiving, for each of the plurality of regions of the scene space, a value of a relation between an estimated total energy of the soundfield and an estimated energy of a regional soundfield that corresponds to the region, wherein the regional soundfield is a portion of the soundfield; and for each of the plurality of regions of the scene space, deciding whether to obtain a description of the corresponding regional soundfield, wherein the deciding is based on the received value corresponding to the region and on a relation between the received location of the user and the indicated location of the region. Computer-readable storage media comprising code which, when executed by at least one processor, causes the at least one processor to perform such a method are also disclosed.

An apparatus for selecting regional soundfields according to a general configuration includes a memory configured to store computer-executable instructions; and a processor coupled to the memory and configured to execute the computer-executable instructions to: receive a location of a user within a scene space associated with a soundfield; receive, for each of a plurality of regions of the scene space, information indicating a location of the region within the scene space; receive, for each of the plurality of regions of the scene space, a value of a relation between an estimated total energy of the soundfield and an estimated energy of a regional soundfield that corresponds to the region, wherein the regional soundfield is a portion of the soundfield; and for each of the plurality of regions, decide whether to obtain a description of the corresponding regional soundfield, wherein the deciding is based on the received value corresponding to the region and on a relation between the received location of the user and the indicated location of the region.

BRIEF DESCRIPTION OF THE DRAWINGS

Aspects of the disclosure are illustrated by way of example. In the accompanying figures, like reference numbers indicate similar elements.

FIG. 10A shows a block diagram of an apparatus F100 according to a general configuration.

FIG. 10B shows a block diagram of an implementation MF200A of means MF200.

FIG. 10C shows a block diagram of an implementation MF240A of means MF240.

FIG. 11A shows a block diagram of an apparatus A100 according to a general configuration.

FIG. 11B shows a block diagram of an implementation 200A of soundfield discriminator 200.

FIG. 11C shows a block diagram of an implementation 240A of soundfield characterizer 240.

DETAILED DESCRIPTION

Figure 1:
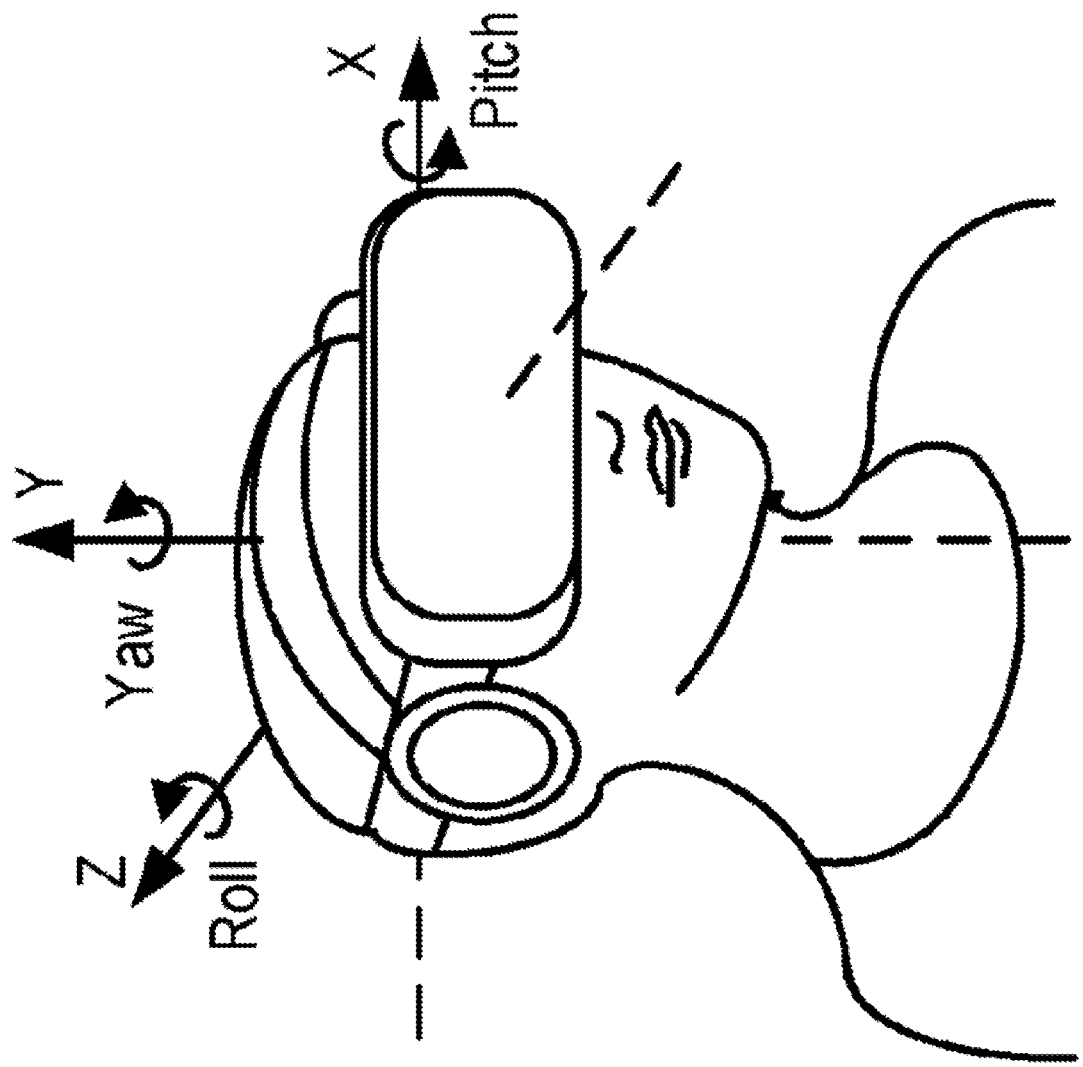
FIG. 1 shows an example of a VR headset that supports detection of movement in 3DOF.
Figure 2:
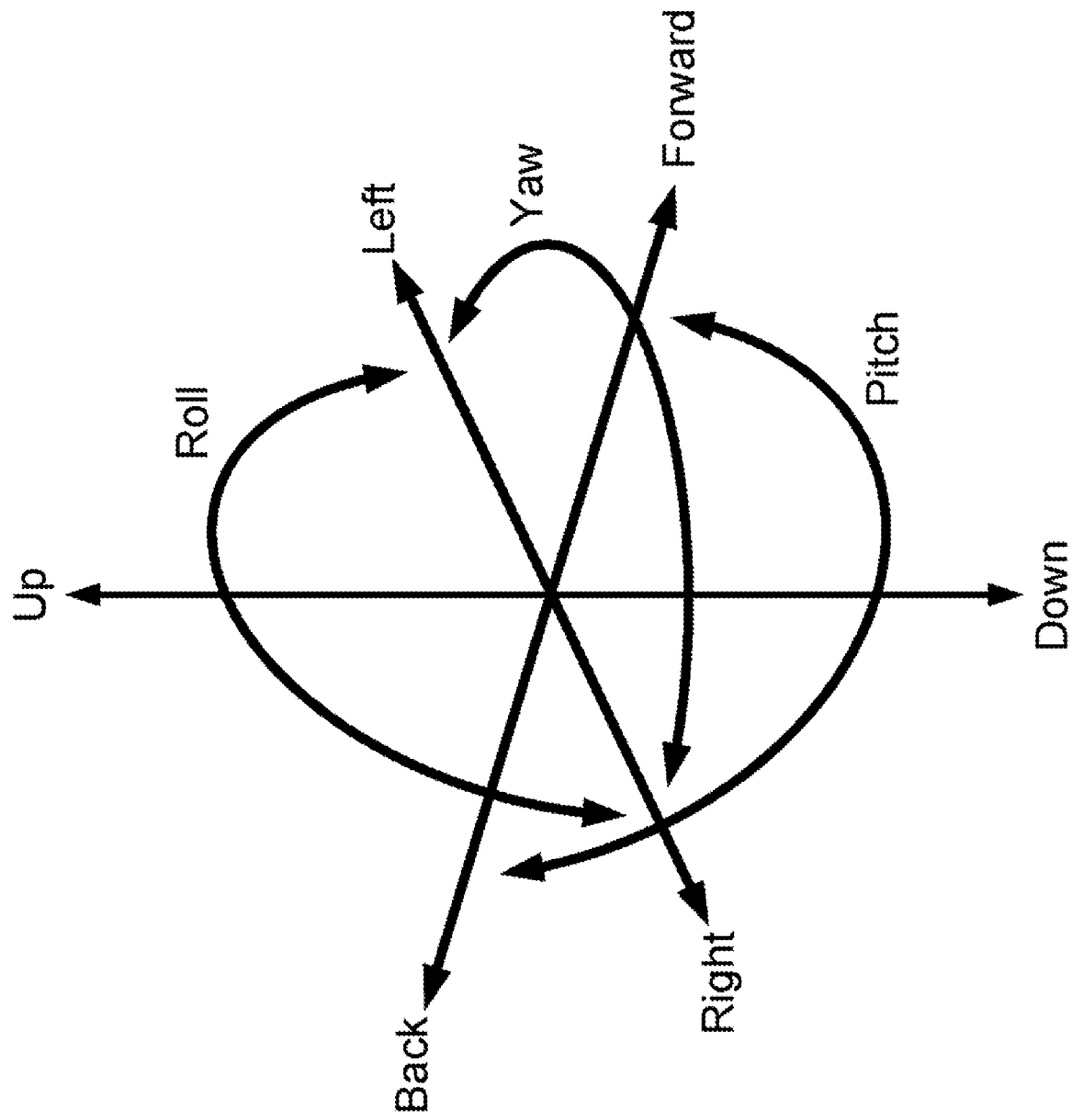
FIG. 2 illustrates the six degrees indicated by 6DOF.

In order to support an immersive VR experience, it may be desirable to adjust a provided audio environment in response to changes in the listener's virtual position. For example, it may be desirable to support virtual movement in six degrees of freedom (6DOF). As shown in FIG. 2, 6DOF includes the three rotational movements of 3DOF and also three translational movements: forward/backward (surge), up/down (heave), and left/right (sway).

Figure 3:
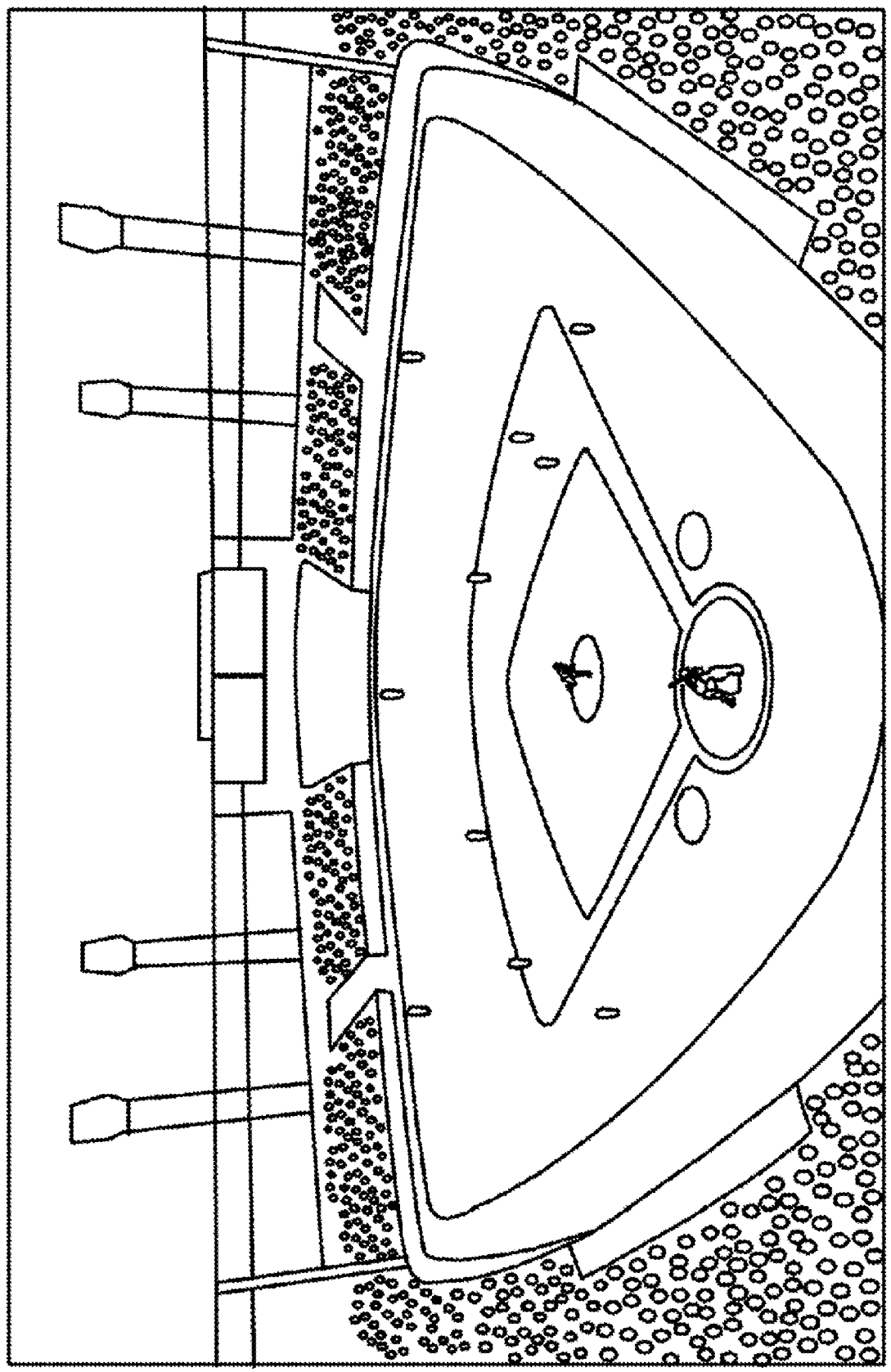
FIG. 3 illustrates an example of a sports event that may be attended by a user in VR.

Examples of 6DOF applications include virtual attendance of a spectator event, such as a sports event (e.g., a baseball game, as shown in FIG. 3), by a remote user. A 6DOF application may record audio from multiple distributed arrays of transducers (e.g., microphones) in order to capture spatial audio over a large scene space (e.g., a baseball stadium, a football field, a cricket field, etc.). Representing the soundfield (i.e., the distribution of air pressure in space and time) over such a large area may involve issues of scalability and efficient compression.

One approach would be to locate, track, and record sound-producing objects (e.g., players on a sports field), and to individually compress each resulting audio stream with metadata signifying the object's position. However, such an approach may be unsuitable for live events and real-time compression. Typically, it is cumbersome and expensive to locate and track many objects; the sound-capturing apparatus may be unable to separate objects that are clustered in space; and object-based representations may consider only point sources and ignore directivity patterns (e.g., the variation with respect to direction of the sound emitted by, for example, a shouting player or a trumpet player).

An area partitioning approach as described herein may be used to support a region-based representation of a large soundfield. Potential advantages of a region-based representation of the audio sources that produce a large soundfield may include efficient compression of the captured spatial audio over the scene space and/or reduced dependency and information redundancy among audio signals from distributed microphone arrays. Such a format may also allow for easier implementation of 6DOF playback, low-complexity 6DOF playback, and/or extra audio effects (e.g., manipulation and/or interaction of audio signals).

Such an approach may be implemented to allow flexibility in partitioning the scene space and corresponding soundfield. Features such as selection of regions and/or allocation of encoding bandwidth according to user needs and interests may also be supported. Such an approach may also be implemented as part of a standardized representation of an immersive environment (for example, MPEG-H (e.g., as described in Advanced Television Systems Committee (ATSC) Doc. A/342-3:2017), MPEG-I (e.g., as described in ISO/IEC 23090)).

Several illustrative configurations will now be described with respect to the accompanying drawings, which form a part hereof. While particular configurations, in which one or more aspects of the disclosure may be implemented, are described below, other configurations may be used and various modifications may be made without departing from the scope of the disclosure or the spirit of the appended claims.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Unless expressly limited by its context, the term "determining" is used to indicate any of its ordinary meanings, such as deciding, establishing, concluding, calculating, selecting, and/or evaluating. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least." Unless otherwise indicated, the terms "at least one of A, B, and C," "one or more of A, B, and C," "at least one among A, B, and C," and "one or more among A, B, and C" indicate "A and/or B and/or C." Unless otherwise indicated, the terms "each of A, B, and C" and "each among A, B, and C" indicate "A and B and C."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique"

are used generically and interchangeably unless otherwise indicated by the particular context. A "task" having multiple subtasks is also a method. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

Figure 4:
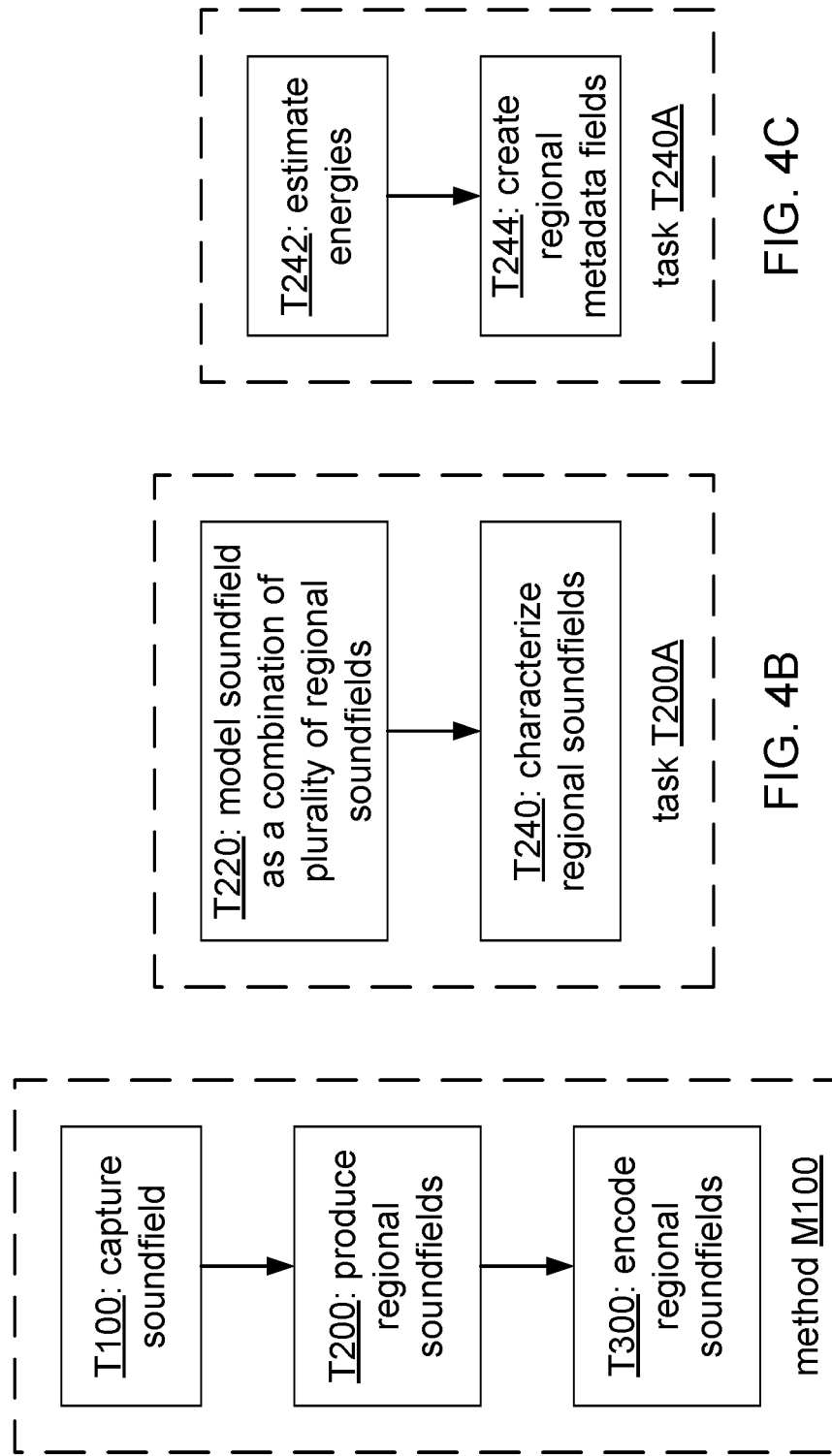
FIG. 4A shows a flowchart of a method M100 according to a general configuration.
FIG. 4B shows a flowchart of an implementation T200A of task T200.
FIG. 4C shows a flowchart of an implementation T240A of task T240.

FIG. 4A shows a flowchart of a method M100 according to a general configuration that includes tasks T100, T200, and T300. Task T100 captures a soundfield that is produced within a scene space, task T200 produces a plurality of regional soundfields, and task T300 encodes at least a plurality of the produced regional soundfields.

Capture task T100 may be performed using one or more arrays of sound-sensing transducers (e.g., microphones) that are positioned outside the scene space (e.g., along a periphery of the scene space). The one or more arrays may include a linear array of transducers. Additionally or alternatively, the one or more arrays may include a spherical array of transducers. One or more arrays may also be positioned within the scene space, and such arrays may include arrays having fixed positions and/or arrays having positions that may change during an event (e.g., that are mounted on people, wires, or drones). For example, one or more arrays within the scene space may be mounted on people participating in the event such as players and/or officials (e.g., referees) in a sports event, performers and/or an orchestra conductor in a music event, etc.

The arrays may be positioned (e.g., directed and/or distributed) so that certain regions of the soundfield are sampled more or less densely than other regions (e.g., depending on the importance of the region of interest). Such positioning may change over time (e.g., to correspond with changes in the focus of interest). Arrangements can vary depending on the size of the field/type of field or to have maximum coverage and reduce blind spots.

Task T200 produces a plurality of regional soundfields. The plurality of regional soundfields may include soundfields that correspond to portions of the captured soundfield. Alternatively or additionally, the regional soundfields may be generated. A generated regional soundfield may include audio that has been captured from another source (e.g., a commentator within a broadcasting booth) and is being added to the soundfield of the scene space. Alternatively or additionally, a generated regional soundfield may include synthetic sound (i.e., sound that is synthesized rather than captured).

FIG. 4B shows a flowchart of an implementation T200A of task T200 that includes subtasks T220, T240, and T260. Subtask T220 models the captured soundfield as a combination of a plurality of regional soundfields, and subtask T240 characterizes the regional soundfields. The modeling corresponds to a partitioning of the scene space into regions that may be of uniform or non-uniform size. Various predefined uniform partitioning schemes based on regions of interest may include partitionings into uniform hexagons, squares, or other polygons. It may be desirable to select a partitioning scheme according to a desired trade-off between uniformity (which may constrain flexibility) and non-uniformity (which may increase the complexity of the descriptions of the various partitions).

Figure 5:
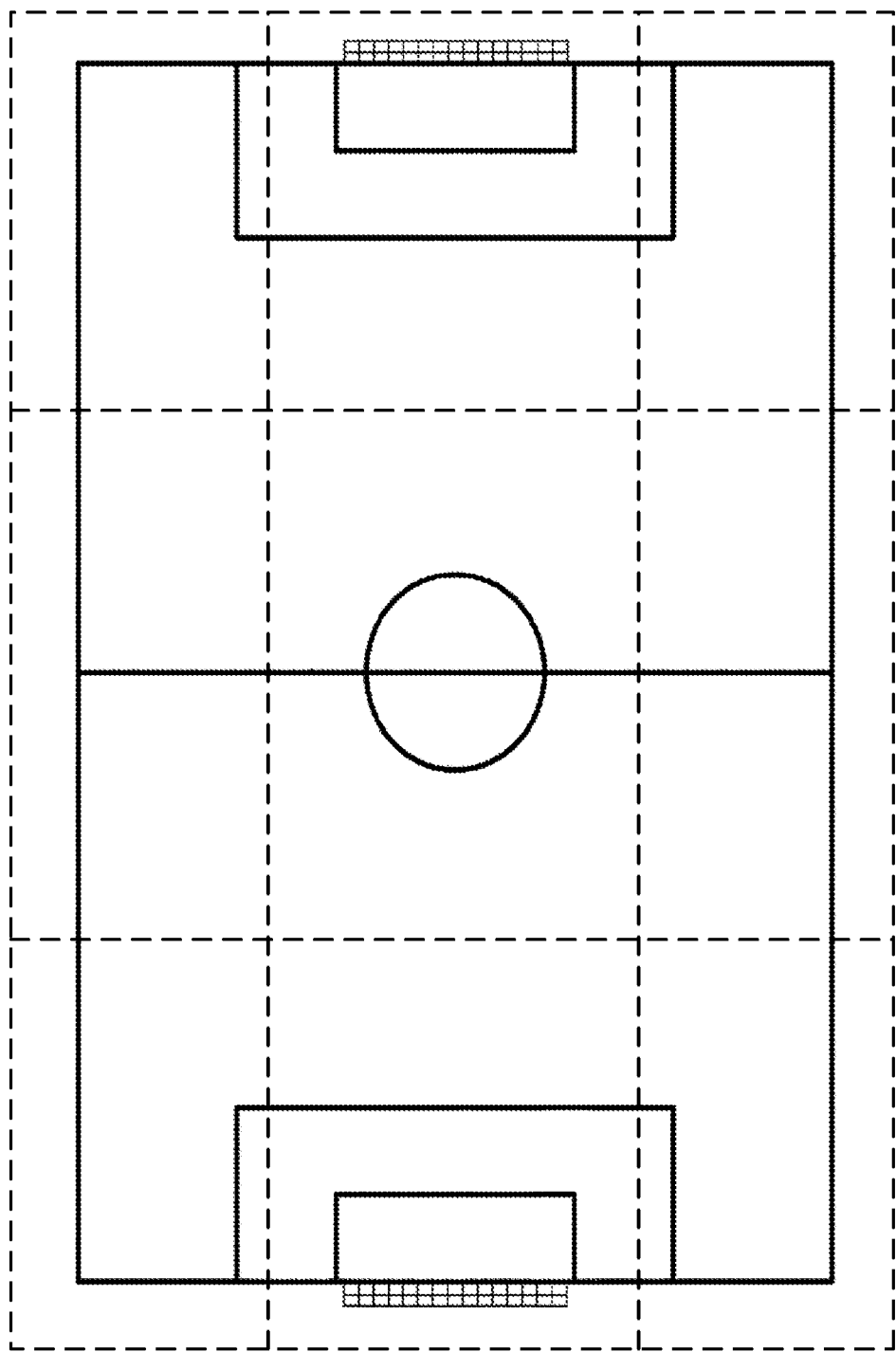
FIG. 5 shows an example of a partitioning of a soccer field into nine regions.
Figure 6:
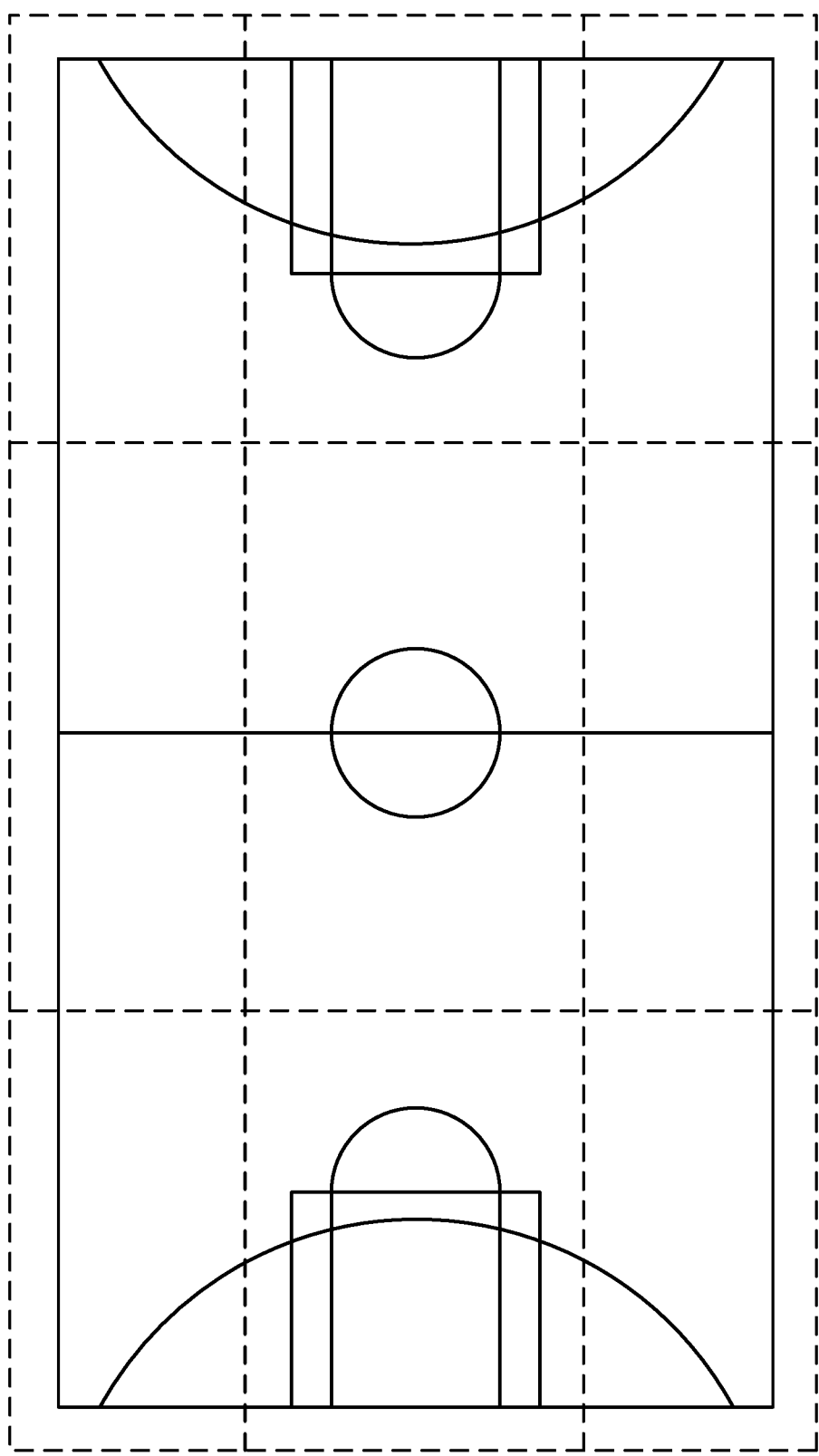
FIG. 6 shows an example of a partitioning of a basketball court into nine regions.
Figure 7:
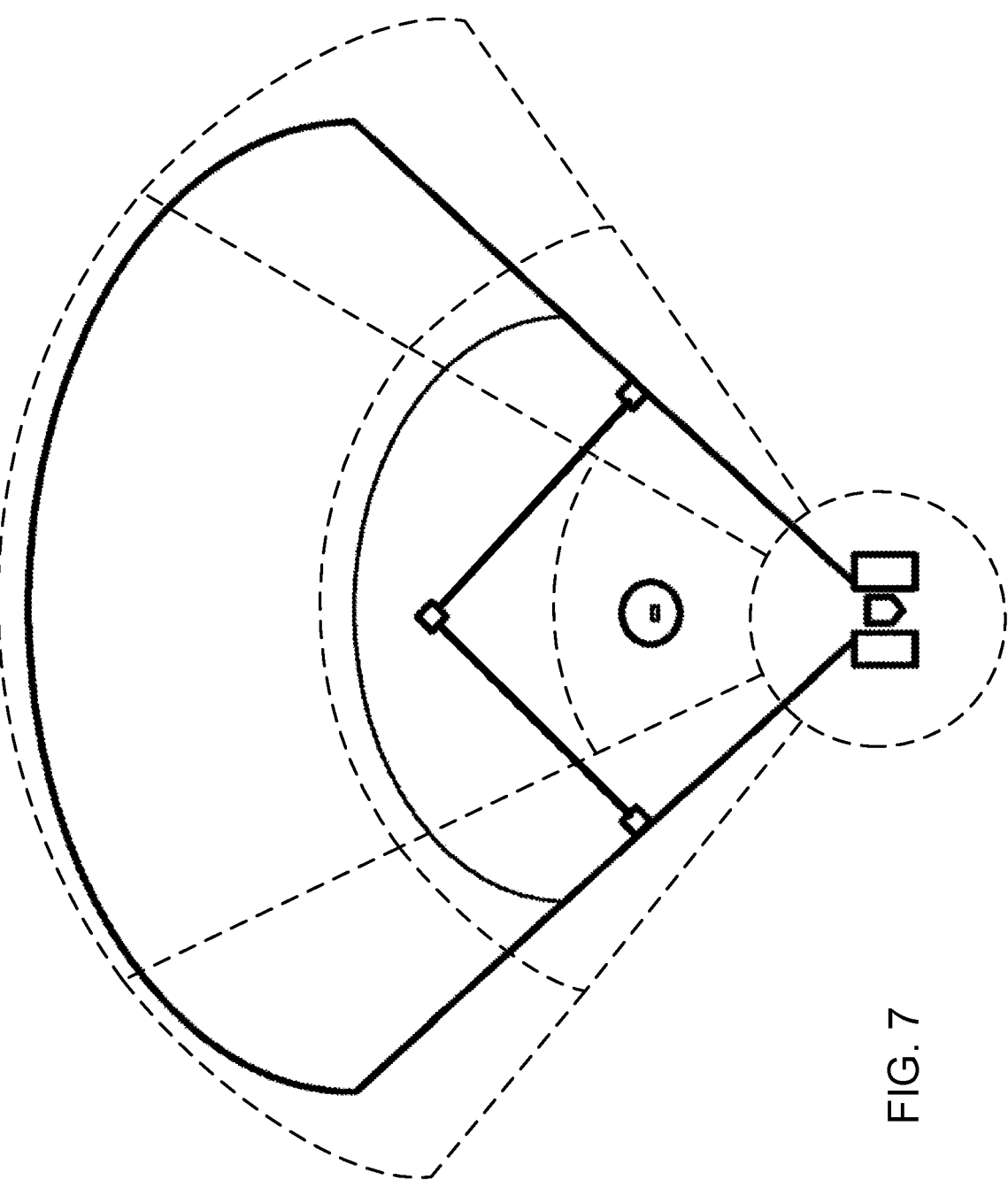
FIG. 7 shows an example of a partitioning of a baseball field into eight regions.

It may be desirable to use a partitioning that is suitable for the expected distribution and type of sound sources within the scene space during an event. A standard corresponding partitioning scheme may be adopted, for example, for a playing field type (e.g., soccer, cricket, football, baseball, basketball), or an orchestra pit, or an orchestra stage. Alternatively or additionally, a default partitioning scheme may be adopted for a particular venue (e.g., a particular stadium (e.g., SDCCU Stadium), a particular baseball park (e.g., Citi Field), a particular concert hall (e.g., Carnegie Hall)). FIGS. 5-7 show examples of partitioning schemes for a soccer field, a basketball court, and a baseball field. It may be desirable to use a different partitioning scheme for the performance area of the scene space (e.g., the playing field or court, the orchestra stage) and the spectator area of the scene space. It may be desirable to implement task T220 to permit the partitioning scheme to change dynamically in response to, for example, an indication that a regional soundfield contains too few or too many sources (e.g., as indicated by video information of the scene space), or too much or too little energy.

The partitioning topology can be varied according to aspects of the scene space (for example, the geometry of the field) and/or preferences. For example, a broadcaster may select a partitioning scheme that is different than a scheme for other users. Alternatively or additionally, it may be desirable to permit a user to select or modify a partitioning scheme: for example, to apply a different partitioning scheme, to expand or contract a region, to select or exclude regions, to rearrange regions spatially (with or without a similar visual rearrangement), etc. Such user selection or modification may be performed, for example, using a mobile device (e.g., a smartphone), a tablet, or any other interactive device or devices.

Figure 8:
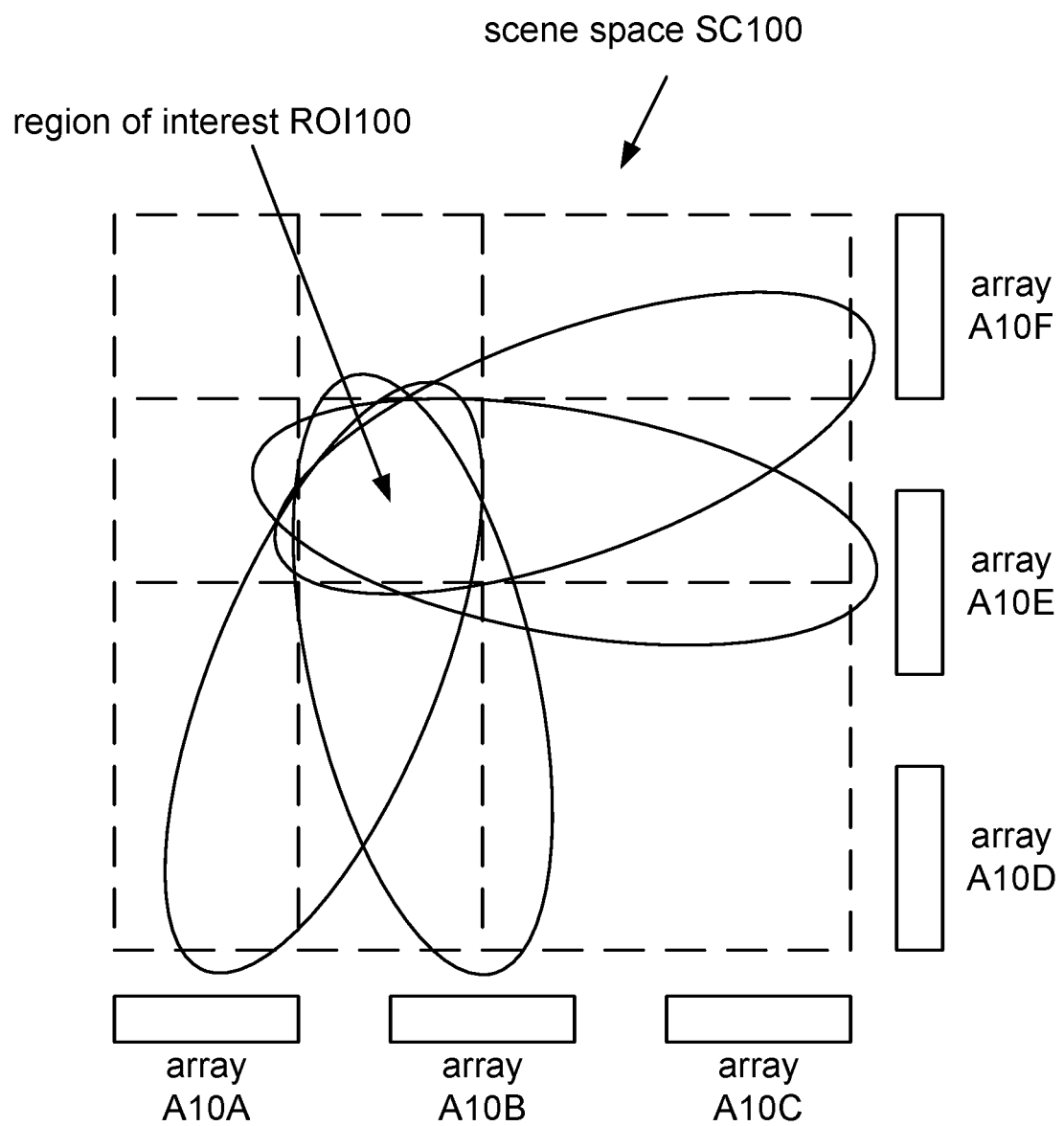
FIG. 8 shows an example of distinguishing a selected region of a soundfield.

Modeling T220 of the soundfield according to the selected partitioning of the scene space may be performed using a spatially selective processing operation, such as beamforming. FIG. 8 shows an example of distinguishing a selected region of a soundfield using selected arrays. In this example, the soundfield within scene space SC100 is captured using six instances A10A-A10F of a multi-microphone array. To distinguish the soundfield corresponding to region of interest ROI100, spatially selective processing operations are performed on the signals captured by arrays A10A, A10B, A10E, and A10F. In this example, the spatially selective processing operations include directing beams in the direction of region ROI100. Modeling T220 of the soundfield may include decomposing the captured soundfield into regional soundfields in such manner and/or may include assigning particular microphones to particular regional soundfields. For example, task T220 may be implemented to assign the signal produced by a microphone worn by a player to the regional soundfield corresponding to the region in which the player is currently located (as indicated by, for example, a GPS receiver on the player and/or video information of the scene space).

FIG. 4C shows a flowchart of an implementation T240A of regional soundfield characterization task T240 that includes subtasks T242 and T244. Subtask T242 estimates an energy for each of at least some of the regional soundfields. In one example, subtask T242 estimates an energy of a regional soundfield by summing the individual energies of the signals of the microphones used to record the regional soundfield and of any other signals added to the regional soundfield. The energy of a signal over a frame of n samples may be calculated, for example, as a sum of the squared n sample values. Typical sampling rates include (without limitation) 44.1, 48, and 96 kilohertz, and typical frame lengths include (without limitation) 576, 1024, and 1152 samples.

Subtask T242 also calculates, for each of the at least some of the regional soundfields, a relation between the estimated regional soundfield energy and an estimated total energy of the soundfield (e.g., as a ratio of the estimated regional soundfield energy to the estimated total energy of the soundfield). The total energy of the soundfield may be estimated as, for example, a sum of the individual energies of the signals of all of the microphones used to record the soundfield and of any other signals that are added to the soundfield. Alternatively, the total energy of the soundfield may be estimated as a sum of the estimated energies of the regional soundfields. A relation as calculated by subtask T242 may be used, for example, during encoding (e.g., for more efficient bit allocation) and/or rendering (e.g., to indicate whether the regional soundfield will be audible at the user's location).

It may be desirable to implement subtask T242 to estimate one or more other characteristics of a regional soundfield (such as entropy and/or wavefield concentration) for use during encoding and/or rendering. Task T242 may be implemented, for example, to estimate entropy from an HOA representation of the regional soundfield by using a singular value decomposition (SVD) to determine the number of eigenvalues, and/or to assume more entropy for a high-energy regional soundfield.

Figure 9A:
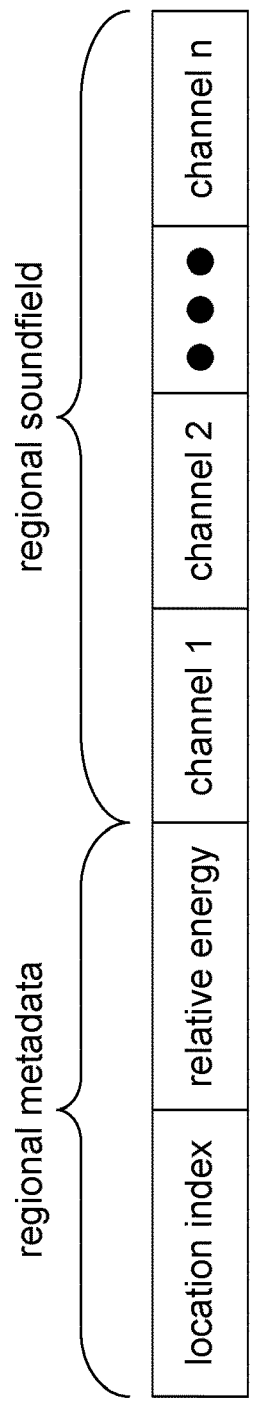
FIG. 9A shows an example of a data structure that includes fields of regional metadata and frames of a corresponding regional soundfield.
Figure 9B:
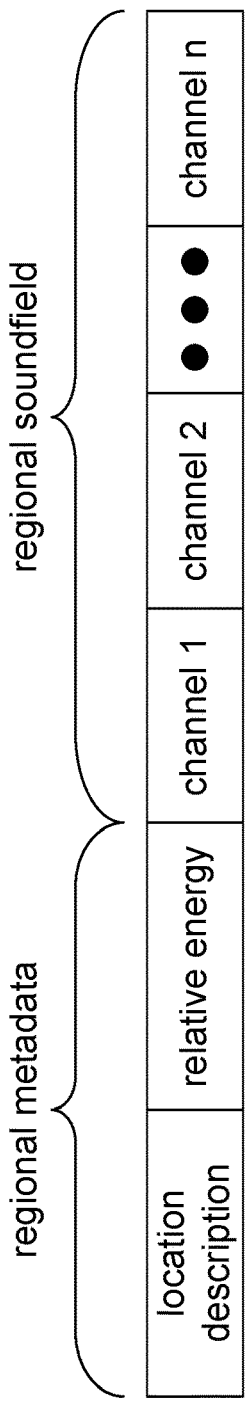
FIG. 9B shows another example of a data structure that includes fields of regional metadata and frames of a corresponding regional soundfield.
Figure 9C:
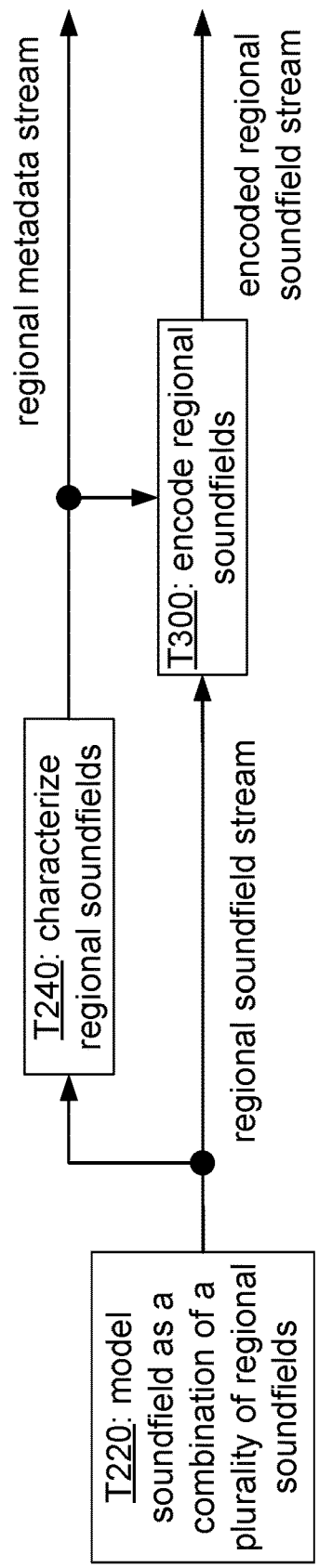
FIG. 9C shows an example of producing a regional soundfield stream and a separate corresponding regional metadata stream.

Subtask T244 creates a metadata field for each of the at least some of the regional soundfields that indicates a location of the corresponding region within the scene space and includes the corresponding calculated energy relation. As shown in FIGS. 9A and 9B, such metadata may be part of a packet that also includes a frame (e.g., 1024 samples at a sampling rate of 48 kHz) for each of one or more channels of the corresponding regional soundfield. FIG. 9A shows an example in which the location of the region is indicated by an index (e.g., for a case in which the partitioning scheme is known to the decoder and/or carried elsewhere in the metadata stream), and FIG. 9B shows an example in which the location of the region is indicated by a description (e.g., spatial coordinates of corners of the region). FIG. 9C shows an example of an alternative arrangement in which the regional soundfield stream and the corresponding regional metadata stream are produced as separate streams. For example, the separate audio and metadata streams may be formatted to be compliant with International Telecommunications Union Recommendation (ITU-R) BS 2076-1 (Audio Definition Model, June 2017).

Task T300 encodes at least a plurality of the produced regional soundfields. In one example, task T300 uses a hierarchical scheme, such as higher-order ambisonics (HOA). Different encoding HOA orders may be used for different regions (e.g., depending on audio entropy (number of sources in the region) and/or importance). In another example, task T300 is implemented to use an object-based scheme (e.g., to encode the regional soundfield as a point source). In a further example, task T300 is implemented to encode the regional soundfield as a plane-wave expansion (e.g., a far-field source that propagates in a given direction without decaying).

Alternatively or additionally, task T300 may be implemented to use different schemes for different regions based on, e.g., predetermined areas of interest inside the field (for example, an object-based scheme for some regions and an HOA scheme for other regions). It may be desirable, for example, to encode regions having a high degree of large wavefield concentration with an object-based or HOA scheme, and to encode regions having a low degree of wavefield concentration (e.g. ambience, crowd noise, clapping) as HOA or plane-wave expansions.

HOA schemes are typically efficient at encoding large numbers of sound sources than object-based schemes (e.g., more objects can be represented by smaller HOA coefficients as compared to an object-based scheme). Benefits of using an HOA scheme may include being able to evaluate and/or represent the soundfield at different listener positions without the need to detect and track individual objects. Rendering of HOA-encoded audio is typically flexible and agnostic to loudspeaker configuration. HOA encoding is also typically valid under free-field conditions, such that translation of a user's virtual listening position can be performed within a valid region close to the nearest source.

Rendering of the soundfield as encoded by task T300 may be performed by reproducing a sum of the contributions of each of the regional soundfields to the soundfield at the user's virtual position. The rendered soundfield may be updated in response to changes in the user's virtual position (e.g., translation of the user) and/or orientation. It may also be desirable to support a user-selected rearrangement of the regional soundfields into a different spatial arrangement. For example, a user in an augmented reality (AR) or VR world may find it easier to navigate to a distant region of interest when it can be moved nearby the user's current location. Alternatively or additionally, a user may wish to cluster regions that are similar but distant from each other (e.g., the goalpost regions of a football field) to hear scenes simultaneously and/or as if near each other.

FIG. 10A shows a block diagram of an apparatus F100 according to a general configuration that includes means MF100 for capturing a soundfield (e.g., as described herein with reference to task T100), means MF200 for producing regional soundfields (e.g., as described herein with reference to task T200), and means MF300 for encoding regional soundfields (e.g., as described herein with reference to task T300).

FIG. 10B shows a block diagram of an implementation MF200A of means MF200 that includes means MF220 for modeling the captured soundfield as a combination of a plurality of regional soundfields (e.g., as described herein with reference to task T220) and means MF240 for characterizing regional soundfields (e.g., as described herein with reference to task T240).

FIG. 10C shows a block diagram of an implementation MF240A of means MF240 that includes means MF242 for estimating energies (e.g., as described herein with reference to task T242) and means MF244 for creating regional metadata fields (e.g., as described herein with reference to task T244).

FIG. 11A shows a block diagram of an apparatus A100 according to a general configuration that includes a recorder 100 configured to capture a soundfield (e.g., as described herein with reference to task T100), a soundfield discriminator 200 configured to produce regional soundfields (e.g., as described herein with reference to task T200), and an encoder 300 configured to encode regional soundfields (e.g., as described herein with reference to task T300).

Figure 12:
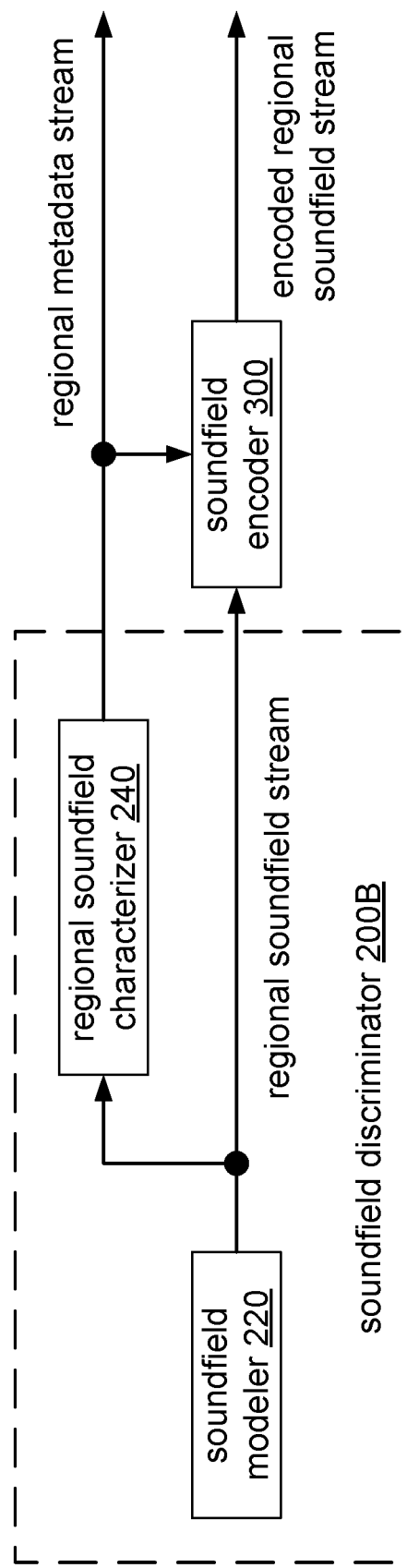
FIG. 12 shows an example of an implementation 200B of soundfield discriminator 200A configured to produce a regional soundfield stream and a separate corresponding regional metadata stream.

FIG. 11B shows a block diagram of an implementation A200A of soundfield discriminator 200 that includes a soundfield modeler 220 configured to model the captured soundfield as a combination of a plurality of regional soundfields (e.g., as described herein with reference to task T220) and a soundfield characterizer 240 configured to characterize regional soundfields (e.g., as described herein with reference to task T240). FIG. 12 shows an example of an implementation 200B of soundfield discriminator 200A configured to produce a regional soundfield stream and a separate corresponding regional metadata stream. In this example, soundfield encoder 300 is implemented to encode the regional soundfield stream according to the regional metadata stream (e.g., by allocating more bits, and/or selecting a higher HOA order, to encode regional soundfields having more energy and/or entropy than other regional soundfields).

FIG. 11C shows a block diagram of an implementation A240A of soundfield characterizer 240 that includes a calculator 242 configured to estimate energies (e.g., as described herein with reference to task T242) and a metadata creator 244 configured to create regional metadata fields (e.g., as described herein with reference to task T244).

Figure 13:
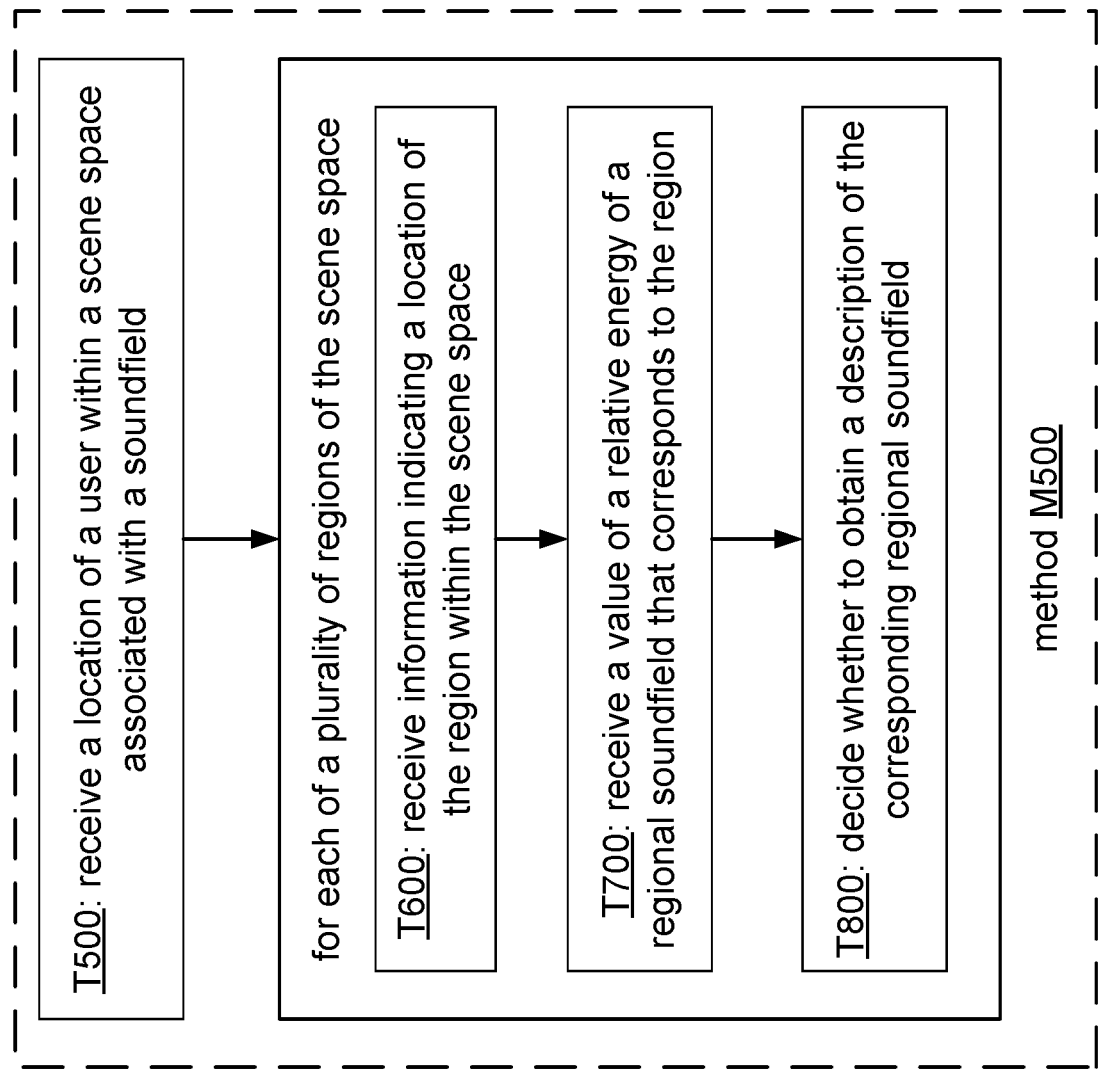
FIG. 13 shows a flowchart of a method M500 of selecting regional soundfields according to a general configuration.

As noted above, information regarding location and relative energy of a regional soundfield (e.g., as estimated by subtask T242) may be used to increase efficiency of an encoding process and/or a rendering process. FIG. 13 shows a flowchart of a method M500 of selecting regional soundfields according to a general configuration that includes tasks T500, T600, T700, and T800. Task T500 receives a location of a user within a scene space associated with a soundfield. The location may be based on data from, for example, one or more sensors tracking the location of the user in the physical world, an input controller, and/or a rendering program that simulates transportation of the user within a virtual space. Method M500 may be implemented using, for example, an augmented reality (AR), virtual reality (VR), and/or mixed reality (MR) device as described herein (such as, e.g., a wearable device).

For each of a plurality of regions of the scene space, task T600 receives information indicating a location of the region within the scene space, and task T700 receives a value of a relative energy of a regional soundfield that is a portion of the soundfield and that corresponds to the region, Task T700 may receive, for example, a value of a relation between an estimated energy of the regional soundfield and an estimated total energy of the soundfield, such as a ratio of the estimated energy of the regional soundfield to the estimated total energy of the soundfield. Tasks T600 and T700 may obtain this information, for example, from metadata as created by task T244 as described above.

The volume of the data streams that describe a large soundfield may be immense, and it is likely that some or even many of the regional soundfields that comprise the soundfield will be inaudible at the location of any individual user. Accordingly, it may be desirable (e.g., for a rendering process) to obtain descriptions only of those regional soundfields that are likely to contribute to the user's experience. Such culling may be expected to increase processing efficiency and/or to reduce bandwidth consumption.

The likelihood that a regional soundfield will contribute to the user's experience depends upon the relative energy of the regional soundfield and also (at least for sources that are not modeled as plane-wave expansions) upon the distance between the user and the region to which the regional soundfield corresponds. The energy of a sound propagating in air may be expected to diminish by a factor of the distance squared. For each of the plurality of regions of the scene space, task T800 decides whether to obtain a description of the corresponding regional soundfield, wherein the deciding is based on the received value corresponding to the region and on a relation between the received location of the user and the indicated location of the region. For example, task T800 may be implemented to weight the relative energy value of each regional soundfield by the reciprocal of the square of the distance between the received location of the user and the indicated location of the region (e.g., a center of mass), and to decide to obtain descriptions only of regional soundfields whose weighted relative energy value exceeds (alternatively, is not less than) a threshold value.

Figure 14:
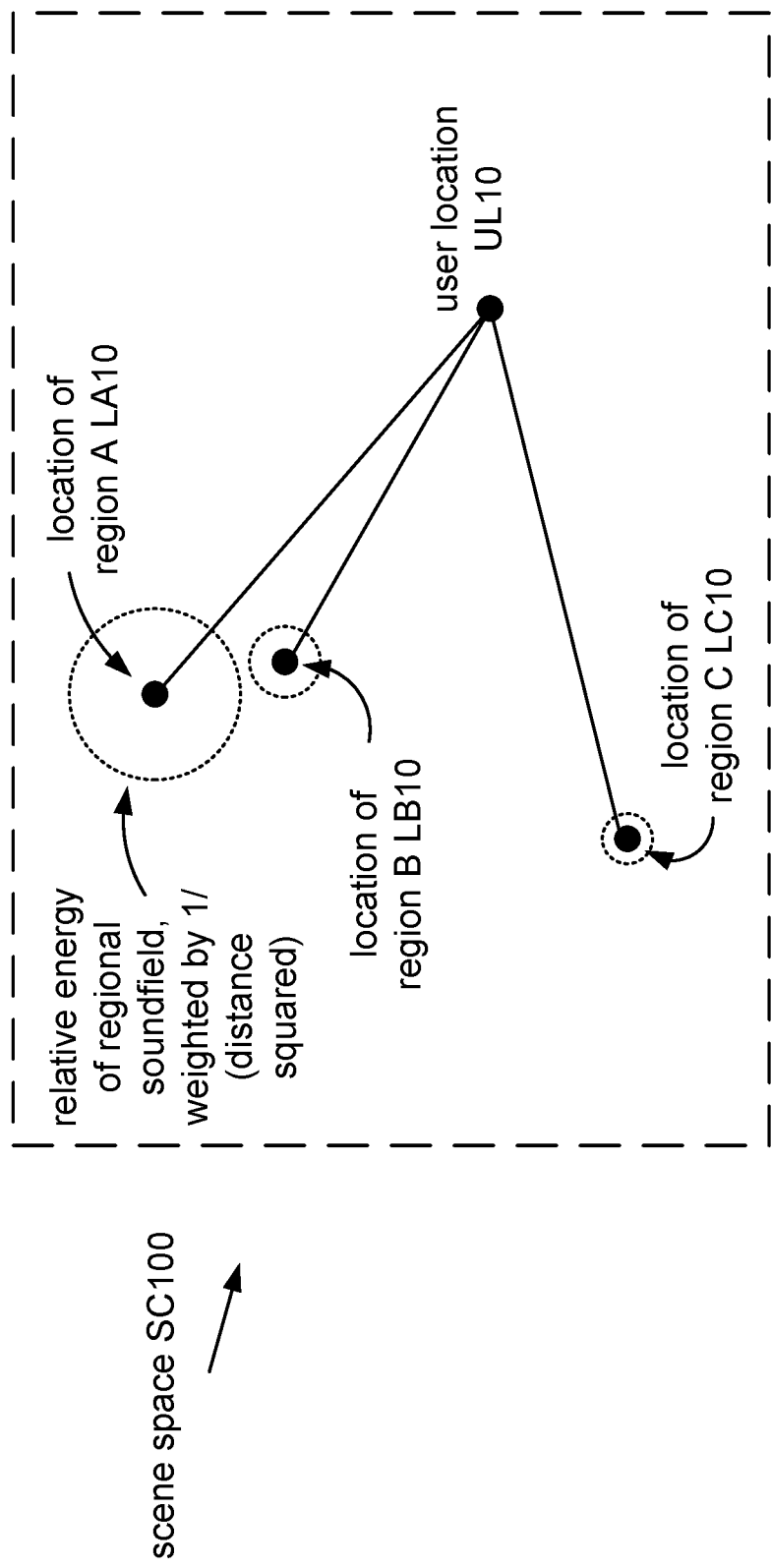
FIG. 14 shows an example of a scene space SC100.

FIG. 14 shows an example of a scene space SC100 in which the location of the user UL10 and the locations of three regions LA10, LB10, and LC10, respectively, are indicated, and in which the dotted lines surrounding the locations of the regions indicate the relative magnitudes of the weighted relative energy values of the corresponding regional soundfields. In this example, it is seen that the weighted relative energy value of the regional soundfield corresponding to region C is relatively very small, so that this regional soundfield is not likely to contribute to the user's auditory experience and may be culled.

Additionally or alternatively, task T800 may be implemented to sort the weighted relative energy values of the regional soundfields (e.g., in decreasing order) and to decide to obtain descriptions of the regional soundfields having the largest weighted relative energy values. Task T800 may be implemented to proceed with such selection until the sum of the weighted relative energy values of the selected regional soundfields exceeds (alternatively, is not less than) a predetermined amount or proportion (e.g., of a sum of the weighted relative energy values of all of the regional soundfields).

Additionally or alternatively, task T800 may be implemented to decide not to obtain a description of a regional soundfield that is likely to be masked by another regional soundfield. FIG. 14 also shows an example in which the directions of regions A and B with respect to the user's location UL10 are relatively close, and the weighted relative energy value corresponding to region A is much larger than the weighted relative energy value corresponding to region B. In such case, it may be likely that the regional soundfield corresponding to region B will be masked by the regional soundfield corresponding to region A, and task T800 may be implemented to decide not to obtain a description of the regional soundfield corresponding to region B.

In one example, an apparatus or device performing method M500 (e.g., a renderer) is further configured to retrieve a stored copy of a description of each of the regional soundfields that it has decided to obtain. In another example, an apparatus or device performing method M500 (e.g., a renderer, which may be a headset worn by the user) is further configured to request a description (e.g., from a server) of each of the regional soundfields that it has decided to obtain. For example, such an apparatus or device may be configured to request the corresponding regional soundfields (e.g., live audio streams) from a server over a wireless connection (e.g., a Wi-Fi (according to, for example, IEEE Standard 802.11-2012) or another wireless networking connection and/or a Long-Term Evolution (LTE) or other cellular data networking connection).

Figure 15:
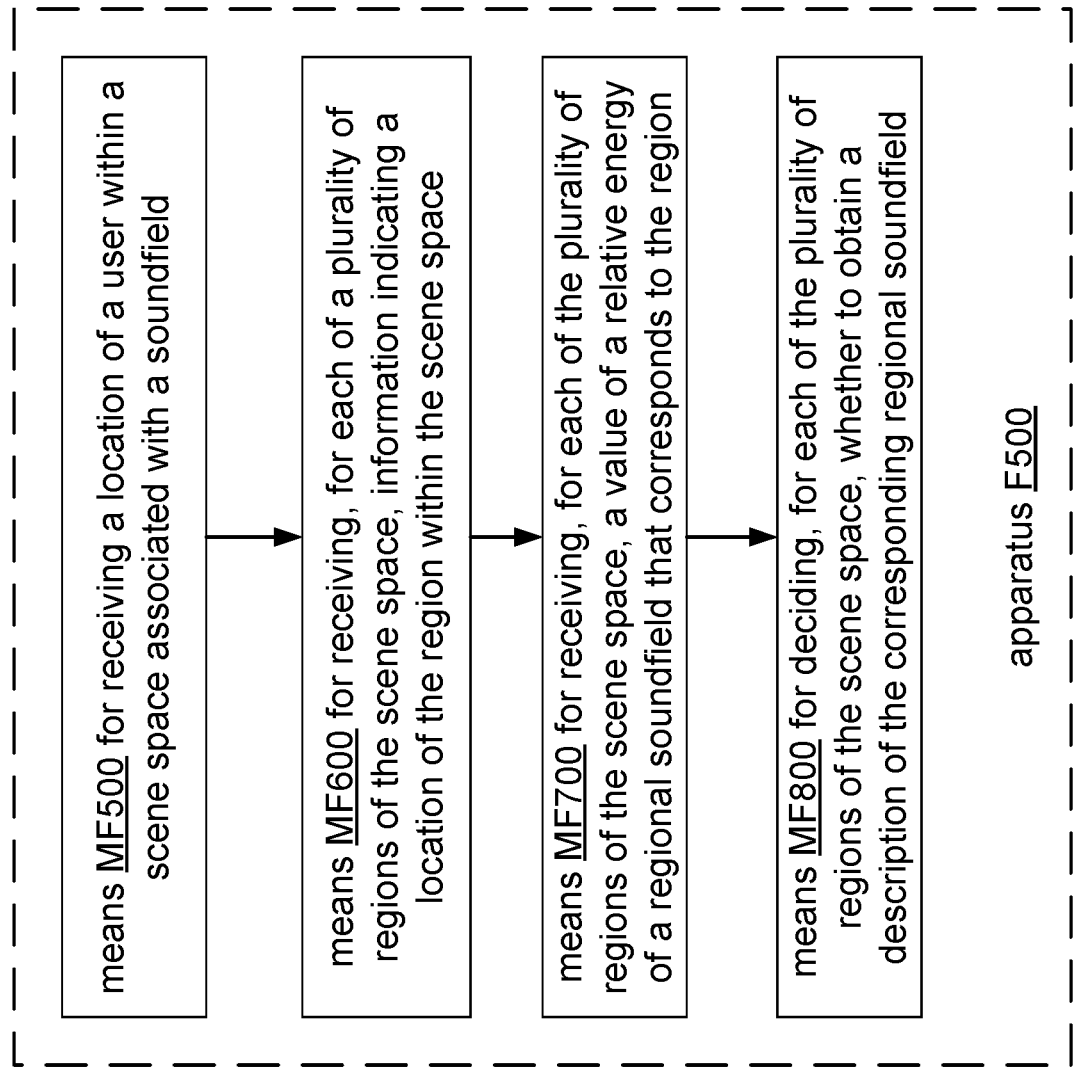
FIG. 15 shows a block diagram of an apparatus for selecting regional soundfields F500 according to a general configuration.

FIG. 15 shows a block diagram of an apparatus for selecting regional soundfields F500 according to a general configuration. Apparatus F500 includes means MF500 for receiving a location of a user within a scene space associated with a soundfield (e.g., as described herein with reference to task T500). Apparatus F500 also includes means MF600 for receiving, for each of a plurality of regions of the scene space, information indicating a location of the region within the scene space (e.g., as described herein with reference to task T600). Apparatus F500 also includes means MF700 for receiving, for each of the plurality of regions of the scene space, a value of a relation between an estimated total energy of the soundfield and an estimated energy of a regional soundfield that corresponds to the region, wherein the regional soundfield is a portion of the soundfield (e.g., as described herein with reference to task T700). Apparatus F100 also includes means MF800 for deciding, for each of the plurality of regions of the scene space, whether to obtain a description of the corresponding regional soundfield, wherein the deciding is based on the received value corresponding to the region and on a relation between the received location of the user and the indicated location of the region (e.g., as described herein with reference to task T800).

Computer-mediated reality systems are being developed to allow computing devices to augment or add to, remove or subtract from, substitute or replace, or generally modify existing reality as experienced by a user. Computer-mediated reality systems may include, as a couple of examples, virtual reality (VR) systems, augmented reality (AR) systems, and mixed reality (MR) systems. The perceived success of computer-mediated reality systems are generally related to the ability of such systems to provide a realistically immersive experience in terms of both video and audio such that the video and audio experiences align in a manner that is perceived as natural and expected by the user. Although the human visual system is more sensitive than the human auditory systems (e.g., in terms of perceived localization of various objects within the scene), ensuring an adequate auditory experience is an increasingly important factor in ensuring a realistically immersive experience, particularly as the video experience improves to permit better localization of video objects that enable the user to better identify sources of audio content.

Figure 16:
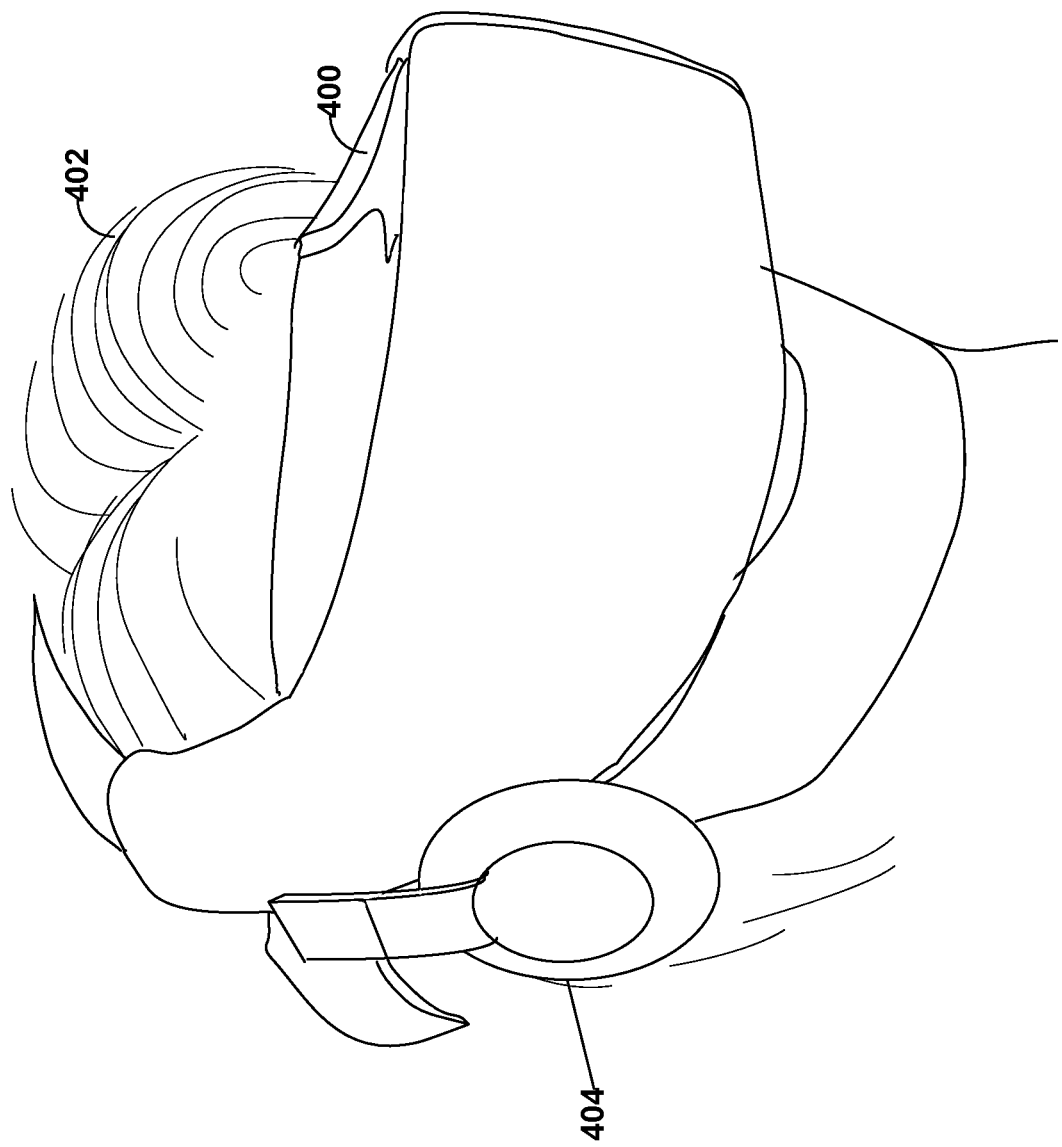
FIG. 16 shows an example 400 of a VR device.

In VR technologies, virtual information may be presented to a user using a head-mounted display such that the user may visually experience an artificial world on a screen in front of their eyes. In AR technologies, the real-world is augmented by visual objects that may be superimposed (e.g., overlaid) on physical objects in the real world. The augmentation may insert new visual objects and/or mask visual objects in the real-world environment. In MR technologies, the boundary between what is real or synthetic/virtual and visually experienced by a user is becoming difficult to discern. Techniques as described herein (e.g., method M500) may be implemented using a VR device 400 as shown in FIG. 16 to improve an experience of a user 402 of the device via headphones 404 of the device.

Video, audio, and other sensory data may play important roles in the VR experience. To participate in a VR experience, the user 402 may wear the VR device 400 (which may also be referred to as a VR headset 400) or other wearable electronic device. The VR client device (such as the VR headset 400) may track head movement of the user 402, and adapt the video data shown via the VR headset 400 to account for the head movements, providing an immersive experience in which the user 402 may experience a virtual world shown in the video data in visual three dimensions.

While VR (and other forms of AR and/or MR) may allow the user 402 to reside in the virtual world visually, often the VR headset 400 may lack the capability to place the user in the virtual world audibly. In other words, the VR system (which may include a computer responsible for rendering the video data and audio data—that is not shown in the example of FIG. 16 for ease of illustration purposes, and the VR headset 400) may be unable to support full three-dimensional immersion audibly (and in some instances realistically in a manner that reflects the virtual scene displayed to the user via the VR headset 400).

Though full three-dimensional audible rendering still poses challenges, the techniques in this disclosure enable a further step towards that end. Audio aspects of AR, MR, and/or VR may be classified into three separate categories of immersion. The first category provides the lowest level of immersion and is referred to as three degrees of freedom (3DOF). 3DOF refers to audio rendering that accounts for movement of the head in the three degrees of freedom (yaw, pitch, and roll), thereby allowing the user to freely look around in any direction. 3DOF, however, cannot account for translational (and orientational) head movements in which the head is not centered on the optical and acoustical center of the soundfield.

The second category, referred to 3DOF plus (or "3DOF+"), provides for the three degrees of freedom (yaw, pitch, and roll) in addition to limited spatial translational (and orientational) movements due to the head movements away from the optical center and acoustical center within the soundfield. 3DOF+ may provide support for perceptual effects such as motion parallax, which may strengthen the sense of immersion.

The third category, referred to as six degrees of freedom (6DOF), renders audio data in a manner that accounts for the three degrees of freedom in term of head movements (yaw, pitch, and roll) but also accounts for translation of a person in space (x, y, and z translations). The spatial translations may be induced, for example, by sensors tracking the location of the person in the physical world, by way of an input controller, and/or by way of a rendering program that simulates transportation of the user within the virtual space.

Audio aspects of VR may be less immersive than the video aspects, thereby potentially reducing the overall immersion experienced by the user. With advances in processors and wireless connectivity, however, it may be possible to achieve 6DOF rendering with wearable AR, MR and/or VR devices. Moreover, in the future it may be possible to take into account movement of a vehicle that has the capabilities of AR, MR and/or VR devices and provide an immersive audio experience. In addition, a person of ordinary skill would recognize that a mobile device (e.g., a handset, smartphone, tablet) may also implement VR, AR, and/or MR techniques.

In accordance with the techniques described in this disclosure, various ways by which to adjust audio data (whether in an audio channel format, an audio object format, and/or an audio scene-based format) may allow for 6DOF audio rendering. 6DOF rendering provides a more immersive listening experience by rendering audio data in a manner that accounts for the three degrees of freedom in term of head movements (yaw, pitch, and roll) and also for translational movements (e.g., in a spatial three-dimensional coordinate system—x, y, z). In implementation, where the head movements may not be centered on the optical and acoustical center, adjustments may be made to provide for 6DOF rendering, and not necessarily be limited to spatial two-dimensional coordinate systems. As disclosed herein, the following figures and descriptions allow for 6DOF audio rendering.

Figure 17:
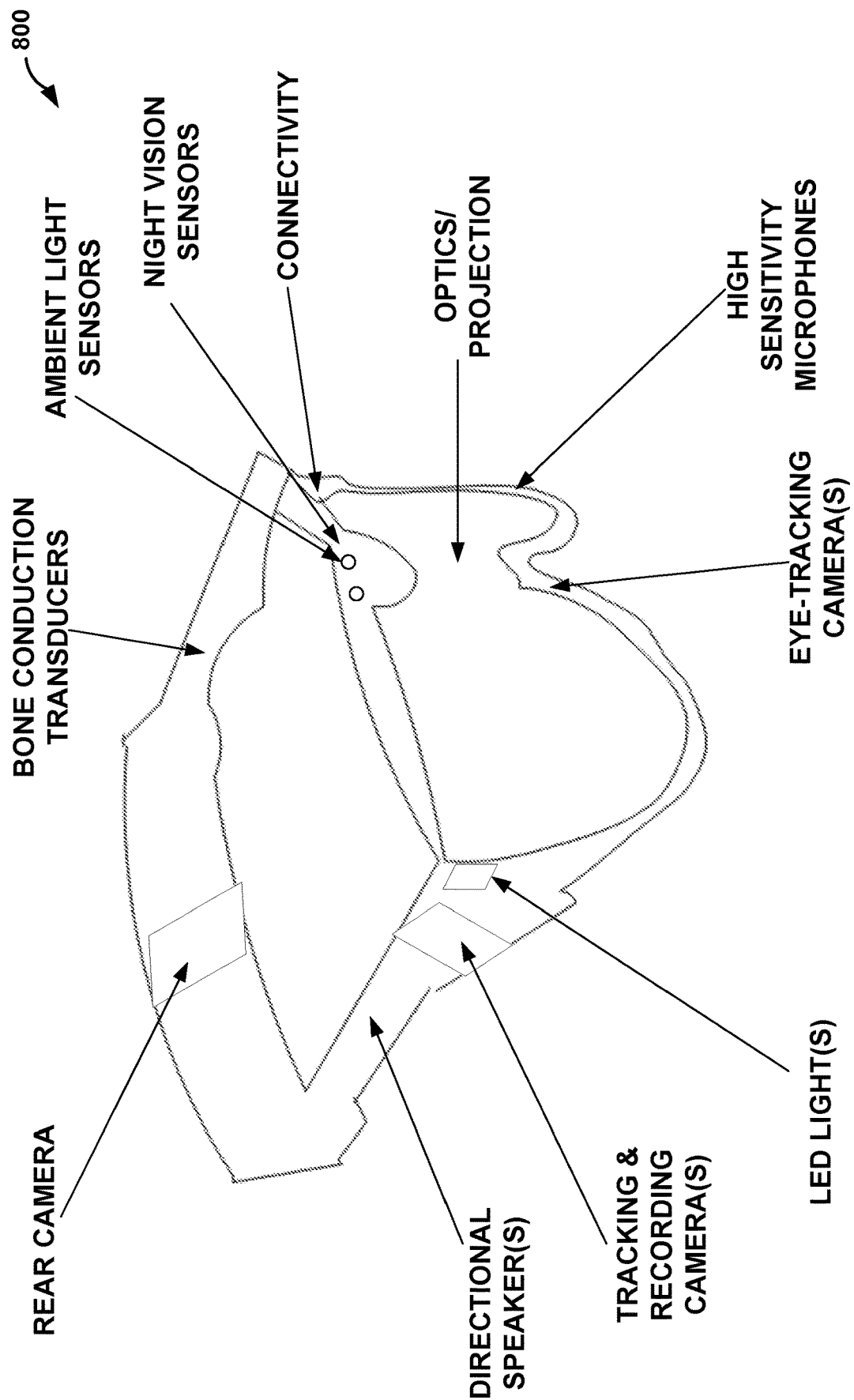
FIG. 17 is a diagram illustrating an example of an implementation 800 of a wearable device.

FIG. 17 is a diagram illustrating an example of an implementation 800 of a wearable device that may operate in accordance with various aspect of the techniques described in this disclosure. In various examples, the wearable device 800 may represent a VR headset (such as the VR headset 400 described above), an AR headset, an MR headset, or an extended reality (XR) headset. Augmented Reality "AR" may refer to computer rendered image or data that is overlaid over the real world where the user is actually located. Mixed Reality "MR" may refer to computer rendered image or data that is world locked to a particular location in the real world, or may refer to a variant on VR in which part computer rendered 3D elements and part photographed real elements are combined into an immersive experience that simulates the user's physical presence in the environment. Extended Reality "XR" may refer to a catchall term for VR, AR, and MR.

The wearable device 800 may represent other types of devices, such as a watch (including so-called "smart watches"), glasses (including so-called "smart glasses"), headphones (including so-called "wireless headphones" and "smart headphones"), smart clothing, smart jewelry, and the like. Whether representative of a VR device, a watch, glasses, and/or headphones, the wearable device 800 may communicate with the computing device supporting the wearable device 800 via a wired connection or a wireless connection.

In some instances, the computing device supporting the wearable device 800 may be integrated within the wearable device 800 and as such, the wearable device 800 may be considered as the same device as the computing device supporting the wearable device 800. In other instances, the wearable device 800 may communicate with a separate computing device that may support the wearable device 800. In this respect, the term "supporting" should not be understood to require a separate dedicated device but that one or more processors configured to perform various aspects of the techniques described in this disclosure may be integrated within the wearable device 800 or integrated within a computing device separate from the wearable device 800.

For example, when the wearable device 800 represents the VR device 400, a separate dedicated computing device (such as a personal computer including one or more processors) may render the audio and visual content, while the wearable device 800 may determine the translational head movement upon which the dedicated computing device may render, based on the translational head movement, the audio content (as the speaker feeds) in accordance with various aspects of the techniques described in this disclosure. As another example, when the wearable device 800 represents smart glasses, the wearable device 800 may include the processor (e.g., one or more processors) that both determines the translational head movement (by interfacing within one or more sensors of the wearable device 800) and renders, based on the determined translational head movement, the loudspeaker feeds.

As shown, the wearable device 800 includes a rear camera, one or more directional speakers, one or more tracking and/or recording cameras, and one or more light-emitting diode (LED) lights. In some examples, the LED light(s) may be referred to as "ultra bright" LED light(s). In addition, the wearable device 800 includes one or more eye-tracking cameras, high sensitivity audio microphones, and optics/projection hardware. The optics/projection hardware of the wearable device 800 may include durable semi-transparent display technology and hardware.

The wearable device 800 also includes connectivity hardware, which may represent one or more network interfaces that support multimode connectivity, such as 4G communications, 5G communications, etc. The wearable device 800 also includes ambient light sensors, and bone conduction transducers. In some instances, the wearable device 800 may also include one or more passive and/or active cameras with fisheye lenses and/or telephoto lenses. The steering angle of the wearable device 800 may be used to select an audio representation of a soundfield (e.g., one of mixed-order ambisonics (MOA) representations) to output via the directional speaker(s)—headphones 404—of the wearable device 800, in accordance with various techniques of this disclosure. It will be appreciated that the wearable device 800 may exhibit a variety of different form factors.

Although not shown in the example of FIG. 17, wearable device 800 may include an orientation/translation sensor unit, such as a combination of a microelectromechanical system (MEMS) for sensing, or any other type of sensor capable of providing information in support of head and/or body tracking. In one example, the orientation/translation sensor unit may represent the MEMS for sensing translational movement similar to those used in cellular phones, such as so-called "smartphones."

Although described with respect to particular examples of wearable devices, a person of ordinary skill in the art would appreciate that descriptions related to FIGS. 16 and 17 may apply to other examples of wearable devices. For example, other wearable devices, such as smart glasses, may include sensors by which to obtain translational head movements. As another example, other wearable devices, such as a smart watch, may include sensors by which to obtain translational movements. As such, the techniques described in this disclosure should not be limited to a particular type of wearable device, but any wearable device may be configured to perform the techniques described in this disclosure (e.g., method M500).

Figure 18:
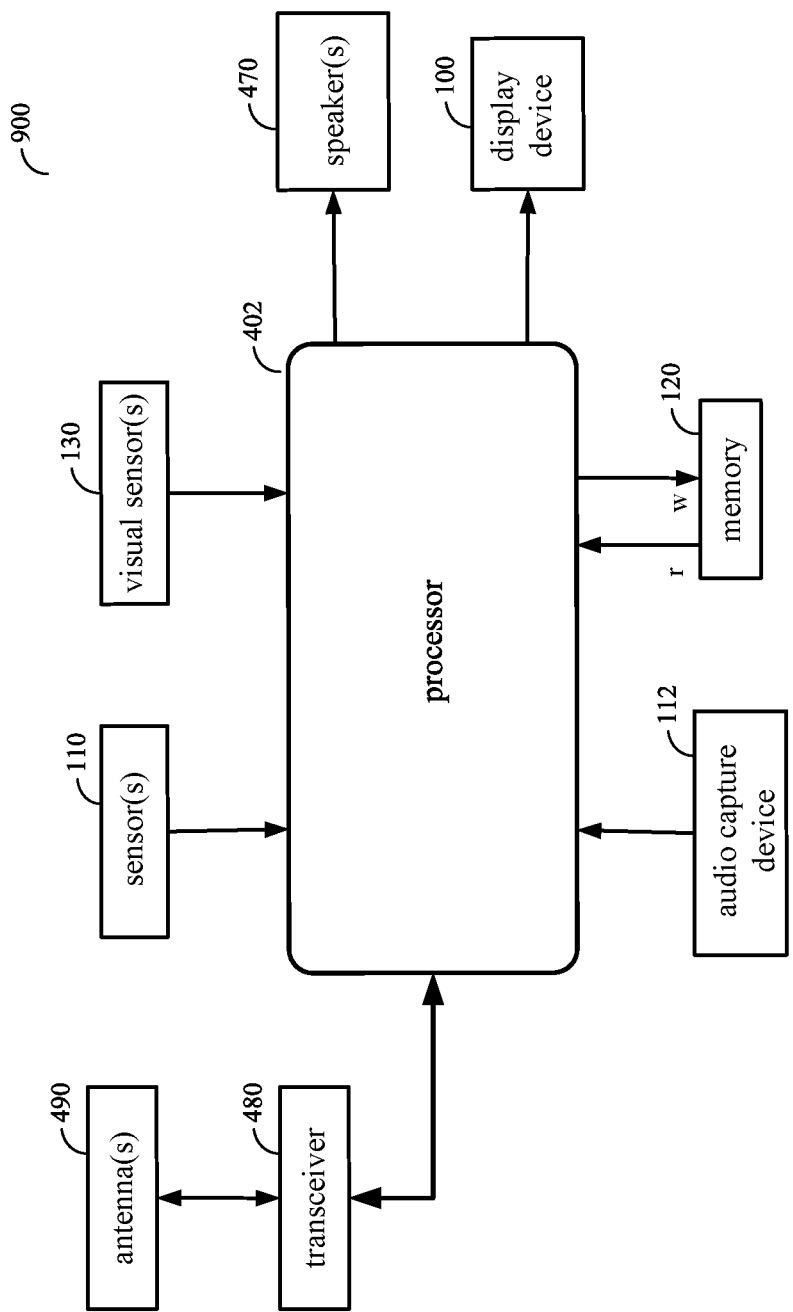
FIG. 18 shows a block diagram of a system 900 that may be implemented within a device.

FIG. 18 shows a block diagram of a system 900 that may be implemented within a device (e.g., wearable device 400 or 800). System 900 may be implemented to include an implementation of an apparatus as described herein (e.g., apparatus F500). System 900 includes a processor 402 (e.g., one or more processors) that may be configured, for example, to perform method M500 as described herein. System 900 also includes a memory 120 coupled to processor 402, sensors 110 (e.g., ambient light sensors of device 800, orientation and/or tracking sensors), visual sensors 130 (e.g., night vision sensors, tracking and recording cameras, eye-tracking cameras, and rear camera of device 800), display device 100 (e.g., optics/projection of device 800), audio capture device 112 (e.g., high-sensitivity microphones of device 800), loudspeakers 470 (e.g., headphones 404 of device 400, directional speakers of device 800), transceiver 480, and antennas 490.

The various elements of an implementation of an apparatus or system as disclosed herein (e.g., apparatus A100, F100, or F500) may be embodied in any combination of hardware with software and/or with firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs (digital signal processors), FPGAs (field-programmable gate arrays), ASSPs (application-specific standard products), and ASICs (application-specific integrated circuits). A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of method M100 or M500 (or another method as disclosed with reference to operation of an apparatus or system described herein), such as a task relating to another operation of a device or system in which the processor is embedded (e.g., a voice communications device, such as a smartphone, or a smart speaker). It is also possible for part of a method as disclosed herein to be performed under the control of one or more other processors.

Each of the tasks of the methods disclosed herein (e.g., methods M100, M500) may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

In one example, a non-transitory computer-readable storage medium comprises code which, when executed by at least one processor, causes the at least one processor to perform a method of characterizing portions of a soundfield as described herein. Further examples of such a storage medium include a medium further comprising code which, when executed by the at least one processor, causes the at least one processor to model the soundfield, based on the defined partitioning of the scene space, as a combination of the portions that correspond to the regions (e.g., as described herein with reference to task T220); a medium further comprising code which, when executed by the at least one processor, causes the at least one processor to record the soundfield (e.g., as described herein with reference to task T100); and a medium further comprising code which, when executed by the at least one processor, causes the at least one processor to encode, for each of the at least some of a plurality of regions of the scene space, the portion of the soundfield that corresponds to the region, based on the corresponding created metadata field (e.g., as described herein with reference to task T300), wherein such encoding may comprise encoding at least one of the portions as a higher-order ambisonics representation. In another example, a non-transitory computer-readable storage medium comprises code which, when executed by at least one processor, causes the at least one processor to perform a method of selecting regional soundfields as described herein (e.g., method M500).

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A method of characterizing portions of a soundfield, the method comprising:
   estimating a total energy of a soundfield associated with a scene space; and
   for each region of a plurality of regions of the scene space:
   estimating an energy of a portion of the soundfield that corresponds to the region; and
   creating a corresponding metadata field that indicates a location of the region within the scene space and a relation between the estimated total energy and the estimated energy that corresponds to the region,
   wherein a further metadata field indicates a defined partitioning of the scene space into at least the plurality of regions.

2. The method according to claim 1, wherein the method further comprises, based on the defined partitioning of the scene space, modeling the soundfield as a combination of the portions that correspond to the regions.

3. The method according to claim 1, wherein the method further comprises capturing the soundfield.

4. The method according to claim 1, wherein the method further comprises, for each region of the plurality of regions of the scene space, encoding the portion of the soundfield that corresponds to the region, based on the corresponding created metadata field.

5. The method according to claim 4, wherein the encoding comprises encoding at least one of the portions as a higher-order ambisonics representation.

6. An apparatus for characterizing portions of a soundfield, the apparatus comprising:
   means for estimating a total energy of a soundfield associated with a scene space;
   means for estimating, for each region of a plurality of regions of the scene space, an energy of a portion of the soundfield that corresponds to the region; and
   means for creating, for each region of the plurality of regions of the scene space, a corresponding metadata field that indicates a location of the region within the scene space and a relation between the estimated total energy and the estimated energy that corresponds to the region,
   wherein a further metadata field indicates a defined partitioning of the scene space into at least the plurality of regions.

7. An apparatus for characterizing portions of a soundfield, the apparatus comprising:
   a memory configured to store computer-executable instructions; and
   a processor coupled to the memory and configured to execute the computer-executable instructions to:
   estimate a total energy of a soundfield associated with a scene space;
   for each region of a plurality of regions of the scene space, estimate an energy of a portion of the soundfield that corresponds to the region; and
   create, for each region of the plurality of regions of the scene space, a corresponding metadata field that indicates a location of the region within the scene space and a relation between the estimated total energy and the estimated energy that corresponds to the region,
   wherein a further metadata field indicates a defined partitioning of the scene space into at least the plurality of regions.

8. The apparatus according to claim 7, wherein the processor is further configured to model the soundfield, based on the defined partitioning of the scene space, as a combination of the portions that correspond to the regions.

9. The apparatus according to claim 7, wherein the processor is further configured to execute the computer-executable instructions to capture the soundfield.

10. The apparatus according to claim 7, wherein the processor is further configured to execute the computer-executable instructions to encode, for each region of the plurality of regions of the scene space, the portion of the soundfield that corresponds to the region, based on the corresponding created metadata field.

11. The apparatus according to claim 10, wherein the processor is further configured to encode at least one of the portions as a higher-order ambisonics representation.

12. A non-transitory computer-readable storage medium comprising code which, when executed by at least one processor, causes the at least one processor to perform a method of characterizing portions of a soundfield, the method comprising:
   estimating a total energy of a soundfield associated with a scene space; and
   for each region of a plurality of regions of the scene space:
   estimating an energy of a portion of the soundfield that corresponds to the region; and
   creating a corresponding metadata field that indicates a location of the region within the scene space and a relation between the estimated total energy and the estimated energy that corresponds to the region,
   wherein a further metadata field indicates a defined partitioning of the scene space into at least the plurality of regions.

13. A method of selecting regional soundfields, the method comprising:
   receiving a location of a user within a scene space associated with a soundfield;
   receiving, for each region of a plurality of regions of the scene space, information indicating a location of the region within the scene space;
   receiving, for each region of the plurality of regions of the scene space, a value of a relation between an estimated total energy of the soundfield and an estimated energy of a regional soundfield that corresponds to the region, wherein the regional soundfield is a portion of the soundfield; and
   for each region of the plurality of regions of the scene space, deciding whether to obtain a description of the corresponding regional soundfield, wherein the deciding is based on the received value corresponding to the region and on a relation between the received location of the user and the indicated location of the region.

14. The method of claim 13, wherein the receiving a location of a user comprises receiving the location of the user from a device worn by the user.

15. The method of claim 13, wherein, for at least one of the plurality of regions, the deciding whether to obtain a description of the corresponding regional soundfield comprises deciding to obtain a description of the corresponding regional soundfield, and
   wherein the method further comprises, for each of the at least one of the plurality of regions, and in response to the deciding to obtain a description of a regional soundfield, retrieving a stored copy of the description.

16. The method of claim 13, wherein, for at least one of the plurality of regions, the deciding whether to obtain a description of the corresponding regional soundfield comprises deciding to obtain a description of the corresponding regional soundfield, and wherein the method further comprises, for each of the at least one of the plurality of regions, and in response to the deciding to obtain a description of a regional soundfield, requesting the description of the regional soundfield from a server.

17. An apparatus for selecting regional soundfields, the apparatus comprising:
a memory configured to store computer-executable instructions; and
a processor coupled to the memory and configured to execute the computer-executable instructions to:
receive a location of a user within a scene space associated with a soundfield;
receive, for each region of a plurality of regions of the scene space, information indicating a location of the region within the scene space;
receive, for each region of the plurality of regions of the scene space, a value of a relation between an estimated total energy of the soundfield and an estimated energy of a regional soundfield that corresponds to the region, wherein the regional soundfield is a portion of the soundfield; and
for each region of the plurality of regions, decide whether to obtain a description of the corresponding regional soundfield, wherein the deciding is based on the received value corresponding to the region and on a relation between the received location of the user and the indicated location of the region.

18. The apparatus of claim 17, wherein the receiving a location of a user comprises receiving the location of the user from a device worn by the user.

19. The apparatus of claim 17, wherein, for at least one of the plurality of regions, the deciding whether to obtain a description of the corresponding regional soundfield comprises deciding to obtain a description of the corresponding regional soundfield, and
wherein the processor is further configured to execute the computer-executable instructions to retrieve, for each of the at least one of the plurality of regions, and in response to the deciding to obtain a description of a regional soundfield, a stored copy of the description.

20. The apparatus of claim 17, wherein, for at least one of the plurality of regions, the deciding whether to obtain a description of the corresponding regional soundfield comprises deciding to obtain a description of the corresponding regional soundfield, and
wherein the processor is further configured to execute the computer-executable instructions to request, for each of the at least one of the plurality of regions, and in response to the deciding to obtain a description of a regional soundfield, the description of the regional soundfield from a server.

* * * * *